(12) United States Patent
French et al.

(10) Patent No.: US 10,122,319 B2
(45) Date of Patent: Nov. 6, 2018

(54) SYSTEMS, VEHICLES, AND METHODS FOR MAINTAINING RAIL-BASED ARRAYS OF PHOTOVOLTAIC MODULES

(71) Applicant: Alion Energy, Inc., Richmond, CA (US)

(72) Inventors: Adam French, San Francisco, CA (US); Kevin Hennessy, Walnut Creek, CA (US)

(73) Assignee: Alion Energy, Inc., Richmond, CA (US)

( * ) Notice: Subject to any disclaimer, the term of this patent is extended or adjusted under 35 U.S.C. 154(b) by 656 days.

(21) Appl. No.: 14/476,458

(22) Filed: Sep. 3, 2014

(65) Prior Publication Data

US 2015/0144156 A1    May 28, 2015

Related U.S. Application Data

(60) Provisional application No. 61/874,290, filed on Sep. 5, 2013.

(51) Int. Cl.
*H02S 40/10*    (2014.01)
*B08B 1/04*    (2006.01)
(Continued)

(52) U.S. Cl.
CPC .............. *H02S 40/10* (2014.12); *A46B 13/02* (2013.01); *B08B 1/008* (2013.01); *B08B 1/04* (2013.01);
(Continued)

(58) Field of Classification Search
CPC .. F24J 2/461; A47L 11/38; B08B 1/00; B08B 1/001; B08B 1/002; B08B 1/04;
(Continued)

(56) References Cited

U.S. PATENT DOCUMENTS 3,267,824 A    8/1966    Hudis
3,334,217 A    1/1967    Bickler et al.
(Continued)

FOREIGN PATENT DOCUMENTS

CN    101858659    10/2010
CN    202019322    10/2011
(Continued)

OTHER PUBLICATIONS

Partial machine translation of KR 10-2011-0061166, dated Jun. 9, 2011.*

(Continued)

*Primary Examiner* — Mark Spisich
(74) *Attorney, Agent, or Firm* — Jones Day

(57) ABSTRACT

A system includes an elongated rail including support surfaces and a mounting surface disposed between the support surfaces. Photovoltaic modules can be coupled to the mounting surface and raised relative to the support surfaces. A first maintenance vehicle can include a cleaning head, actuator, motor, and support legs. The support legs can suspend the cleaning head over the photovoltaic modules and can be respectively movably coupled to the support surfaces so as to laterally and sequentially move the cleaning head parallel to the elongated rail and across each of the photovoltaic modules responsive to actuation of the motor. At least a portion of the cleaning head can be vertically movable between a disengaged position spaced apart from the photovoltaic modules and an engaged position in contact with at least one of the photovoltaic modules responsive to actuation of the actuator.

38 Claims, 8 Drawing Sheets

(51) Int. Cl.
*F24S 40/20* (2018.01)
*B08B 1/00* (2006.01)
*A46B 13/02* (2006.01)
*F24J 2/46* (2006.01)

(52) U.S. Cl.
CPC .............. *F24J 2/461* (2013.01); *F24S 40/20* (2018.05); *Y02E 10/40* (2013.01)

(58) Field of Classification Search
CPC ..... B08B 11/00; B08B 2240/00; H02S 40/10; H02S 40/12
See application file for complete search history.

(56) References Cited

U.S. PATENT DOCUMENTS

| | | |
|---|---|---|
| 3,516,340 A | 6/1970 | Perkins |
| 3,540,360 A | 11/1970 | Snow et al. |
| 3,951,506 A | 4/1976 | Bennett et al. |
| 4,145,021 A | 3/1979 | Gaechter et al. |
| 4,219,926 A | 9/1980 | Bloch et al. |
| 4,279,347 A | 7/1981 | Appleman et al. |
| 4,290,416 A | 9/1981 | Maloney et al. |
| 4,296,270 A | 10/1981 | Kohler et al. |
| 4,301,322 A | 11/1981 | Amick et al. |
| 4,301,409 A | 11/1981 | Miller et al. |
| 4,371,139 A | 2/1983 | Clark |
| 4,421,943 A | 12/1983 | Withjack et al. |
| 4,422,614 A | 12/1983 | Santos |
| 4,496,063 A | 1/1985 | Ishii et al. |
| 4,664,270 A | 5/1987 | Voelz |
| 4,667,834 A | 5/1987 | Lanigan et al. |
| 4,676,713 A | 6/1987 | Voelpel |
| 4,706,825 A | 11/1987 | Johnson |
| 4,876,143 A | 10/1989 | Sugita et al. |
| 4,877,365 A | 10/1989 | Lanigan, Jr. et al. |
| 4,880,346 A | 11/1989 | Brassette et al. |
| 4,954,009 A | 9/1990 | Kellison |
| 4,995,377 A | 2/1991 | Eiden et al. |
| 5,022,781 A | 6/1991 | Smith |
| 5,125,608 A | 6/1992 | McMaster et al. |
| 5,143,556 A | 9/1992 | Matlin |
| 5,152,109 A | 10/1992 | Boers |
| D335,541 S | 5/1993 | Rosario-Cartagena |
| 5,228,924 A | 7/1993 | Barker et al. |
| 5,232,519 A | 8/1993 | Glatfelter et al. |
| 5,257,891 A | 11/1993 | Baumann et al. |
| 5,361,704 A | 11/1994 | Bounds |
| 5,460,660 A | 10/1995 | Albright et al. |
| 5,501,744 A | 3/1996 | Albright et al. |
| 5,505,788 A | 4/1996 | Dinwoodie |
| 5,568,713 A | 10/1996 | Gagne et al. |
| 5,593,901 A | 1/1997 | Oswald et al. |
| 5,715,958 A | 2/1998 | Feider et al. |
| 5,800,631 A | 9/1998 | Yamada et al. |
| 5,816,769 A | 10/1998 | Bauer et al. |
| 5,826,734 A | 10/1998 | Baumann et al. |
| 6,037,578 A | 3/2000 | Grandjean et al. |
| 6,046,399 A | 4/2000 | Kapner |
| 6,058,930 A | 5/2000 | Shingleton |
| 6,111,189 A | 8/2000 | Garvison et al. |
| 6,149,338 A | 11/2000 | Anderson |
| 6,201,181 B1 | 3/2001 | Azzam et al. |
| 6,233,502 B1 | 5/2001 | Yim |
| 6,495,750 B1 | 12/2002 | Dinwoodie |
| 6,570,084 B2 | 5/2003 | Dinwoodie |
| 6,590,363 B2 | 7/2003 | Teramoto |
| 6,639,421 B1 | 10/2003 | Yoshino et al. |
| 6,722,357 B2 | 4/2004 | Shingleton |
| 6,730,841 B2 | 5/2004 | Heckeroth |
| 6,809,251 B2 | 10/2004 | Dinwoodie |
| 6,962,461 B2 | 11/2005 | Choi et al. |
| 7,086,675 B2 | 8/2006 | Jacobs |
| 7,234,275 B1 | 6/2007 | Haggy et al. |
| 7,252,083 B2 | 8/2007 | Hayden |
| 7,309,850 B2 | 12/2007 | Sinton et al. |
| 7,374,137 B2 | 5/2008 | Staney |
| 7,411,408 B2 | 8/2008 | Shimotomai et al. |
| 7,476,832 B2 | 1/2009 | Vendig et al. |
| 7,492,120 B2 | 2/2009 | Benn et al. |
| 7,531,741 B1 | 5/2009 | Melton et al. |
| 7,546,929 B2 | 6/2009 | Wierzba et al. |
| 7,712,807 B2 | 5/2010 | Perlman et al. |
| 7,799,987 B1 | 9/2010 | Hines et al. |
| 7,814,899 B1 | 10/2010 | Port |
| 7,888,588 B2 | 2/2011 | Shingleton |
| 7,898,212 B2 | 3/2011 | Benn et al. |
| 7,963,578 B2 | 6/2011 | Wells et al. |
| 8,006,624 B2 | 8/2011 | Sin |
| 8,203,237 B1 | 6/2012 | Cowles |
| 8,240,320 B2 | 8/2012 | Mertins |
| 8,245,459 B2 | 8/2012 | Belikoff et al. |
| 8,234,496 B1 | 12/2012 | Gross et al. |
| 8,371,076 B2 | 2/2013 | Jones et al. |
| 8,407,950 B2 | 4/2013 | Hartelius |
| 8,464,496 B2 | 6/2013 | Cusson et al. |
| 8,492,645 B1 | 7/2013 | Strahm |
| 8,500,918 B1 | 8/2013 | Meller et al. |
| 8,550,419 B2 | 10/2013 | Hausner et al. |
| 8,573,545 B2 | 11/2013 | Walquist et al. |
| 8,578,928 B2 | 11/2013 | Lumbreras |
| 8,607,512 B2 | 12/2013 | Batut |
| 8,609,977 B2 | 12/2013 | Jones et al. |
| 8,635,818 B2 | 1/2014 | Wildes |
| 8,657,991 B2 | 2/2014 | Potter et al. |
| 8,752,343 B2 | 6/2014 | Kuan et al. |
| 8,763,601 B2 | 7/2014 | Doyle |
| 8,894,424 B2 | 11/2014 | DuPont |
| 8,962,972 B2 | 2/2015 | Sagayama |
| 9,038,332 B1 | 5/2015 | Littlestone et al. |
| 9,192,966 B2 | 11/2015 | Zanatta |
| 9,324,892 B2 | 4/2016 | Powrozek et al. |
| 9,343,592 B2 | 5/2016 | Hunt |
| 9,352,941 B2 | 5/2016 | Wheeler et al. |
| 9,355,873 B2 | 5/2016 | Eitelhuber |
| 9,453,660 B2 | 9/2016 | French et al. |
| 9,462,734 B2 | 10/2016 | Swahn et al. |
| 9,641,123 B2 | 5/2017 | Swahn et al. |
| 9,655,292 B2 | 5/2017 | Swahn et al. |
| 9,657,967 B2 | 5/2017 | Adriani et al. |
| 2002/0121063 A1 | 9/2002 | Mathias |
| 2003/0075211 A1 | 4/2003 | Makita et al. |
| 2003/0097813 A1 | 5/2003 | Phelan et al. |
| 2004/0197140 A1 | 10/2004 | Maleska |
| 2004/0250491 A1 | 12/2004 | Diaz et al. |
| 2005/0061360 A1 | 3/2005 | Horioka et al. |
| 2005/0126621 A1 | 6/2005 | Dinwoodie et al. |
| 2005/0217716 A1 | 10/2005 | Masuda et al. |
| 2005/0268959 A1 | 12/2005 | Aschenbrenner et al. |
| 2006/0054162 A1 | 3/2006 | Romeo |
| 2006/0070621 A1 | 4/2006 | Neumann et al. |
| 2006/0174931 A1 | 8/2006 | Mapes et al. |
| 2006/0290344 A1 | 12/2006 | Shimotomai et al. |
| 2007/0012352 A1 | 1/2007 | Wohlgemuth et al. |
| 2007/0215145 A1 | 9/2007 | Hayden |
| 2007/0283996 A1 | 12/2007 | Hachtmann et al. |
| 2008/0010915 A1 | 1/2008 | Liebendorfer |
| 2008/0023069 A1 | 1/2008 | Terada et al. |
| 2008/0040990 A1 | 2/2008 | Vendig et al. |
| 2008/0053517 A1 | 3/2008 | Plaisted et al. |
| 2008/0087320 A1 | 4/2008 | Mapes et al. |
| 2008/0099063 A1 | 5/2008 | Armstrong et al. |
| 2008/0121273 A1 | 5/2008 | Plaisted et al. |
| 2008/0135084 A1 | 6/2008 | Scharlack |
| 2008/0156365 A1 | 7/2008 | Scholz et al. |
| 2008/0233429 A1 | 9/2008 | Oguma et al. |
| 2008/0245405 A1 | 10/2008 | Garvison et al. |
| 2008/0271774 A1 | 11/2008 | Kalkanoglu et al. |
| 2008/0306700 A1 | 12/2008 | Kawam et al. |
| 2008/0308091 A1 | 12/2008 | Corio |
| 2009/0014057 A1 | 1/2009 | Croft et al. |
| 2009/0032100 A1 | 2/2009 | Oak |
| 2009/0114261 A1 | 5/2009 | Stancel et al. |
| 2009/0139557 A1 | 6/2009 | Rose et al. |

(56) References Cited

U.S. PATENT DOCUMENTS

| | | |
|---|---|---|
| 2009/0173831 A1 | 7/2009 | Roseman |
| 2009/0191030 A1 | 7/2009 | Bluck et al. |
| 2009/0205270 A1 | 8/2009 | Shaw et al. |
| 2009/0223142 A1 | 9/2009 | Shingleton et al. |
| 2009/0260671 A1 | 10/2009 | Green et al. |
| 2009/0282755 A1 | 11/2009 | Abbott et al. |
| 2009/0293932 A1 | 12/2009 | Augenbraun et al. |
| 2009/0293941 A1 | 12/2009 | Luch |
| 2009/0308430 A1 | 12/2009 | Everett et al. |
| 2010/0031996 A1 | 2/2010 | Basol |
| 2010/0043781 A1 | 2/2010 | Jones et al. |
| 2010/0108118 A1 | 5/2010 | Luch |
| 2010/0127142 A1 | 5/2010 | Genschorek |
| 2010/0147286 A1 | 6/2010 | Xiang et al. |
| 2010/0175337 A1 | 7/2010 | Mascolo et al. |
| 2010/0175738 A1 | 7/2010 | Huss et al. |
| 2010/0206294 A1 | 8/2010 | Blair et al. |
| 2010/0236183 A1 | 9/2010 | Cusson et al. |
| 2010/0252092 A1 | 10/2010 | Lenox et al. |
| 2010/0269429 A1 | 10/2010 | Belikoff et al. |
| 2010/0269888 A1 | 10/2010 | Johnston, Jr. |
| 2010/0269891 A1 | 10/2010 | Kinard et al. |
| 2010/0275975 A1 | 11/2010 | Monschke et al. |
| 2010/0281791 A1 | 11/2010 | Intagliata et al. |
| 2010/0319277 A1 | 12/2010 | Suarez et al. |
| 2010/0325797 A1 | 12/2010 | Horne |
| 2011/0088688 A1 | 4/2011 | Sha et al. |
| 2011/0094542 A1 | 4/2011 | Gonzalez Rodriguez et al. |
| 2011/0126378 A1 | 6/2011 | Ota |
| 2011/0126884 A1 | 6/2011 | Dritsas |
| 2011/0147553 A1 | 6/2011 | Ostermeier et al. |
| 2011/0162691 A1 | 7/2011 | Hartelius |
| 2011/0173900 A1 | 7/2011 | Plaisted et al. |
| 2011/0183540 A1 | 7/2011 | Keenihan et al. |
| 2011/0194900 A1 | 8/2011 | French |
| 2011/0264306 A1 | 10/2011 | Bagge |
| 2011/0284057 A1 | 11/2011 | Swahn et al. |
| 2011/0309215 A1 | 12/2011 | Lu et al. |
| 2012/0027550 A1 | 2/2012 | Bellacicco et al. |
| 2012/0034799 A1 | 2/2012 | Hunt |
| 2012/0037214 A1 | 2/2012 | Sagayama |
| 2012/0056638 A1 | 3/2012 | Swahn |
| 2012/0067738 A1 | 3/2012 | Field |
| 2012/0090176 A1 | 4/2012 | Stancel et al. |
| 2012/0120641 A1 | 5/2012 | Yassa |
| 2012/0125409 A1 | 5/2012 | Belschner et al. |
| 2012/0131866 A1 | 5/2012 | Batut et al. |
| 2012/0132246 A1 | 5/2012 | Hunt et al. |
| 2012/0132262 A1 | 5/2012 | Sagayama |
| 2012/0152233 A1 | 6/2012 | Masuda et al. |
| 2012/0152877 A1* | 6/2012 | Tadayon ............... B25J 5/02 212/224 |
| 2012/0186632 A1 | 7/2012 | Reinhold et al. |
| 2012/0198682 A1 | 8/2012 | Potter et al. |
| 2012/0198779 A1 | 8/2012 | Tachino |
| 2012/0199266 A1 | 8/2012 | Potter et al. |
| 2012/0206294 A1 | 8/2012 | Cho |
| 2012/0223033 A1 | 9/2012 | Molek |
| 2012/0298201 A1 | 11/2012 | Stephan |
| 2012/0318325 A1 | 12/2012 | Liu |
| 2013/0048583 A1 | 2/2013 | Kruse |
| 2013/0068275 A1 | 3/2013 | Swahn et al. |
| 2013/0084419 A1 | 4/2013 | Taylor et al. |
| 2013/0133172 A1 | 5/2013 | Kiener et al. |
| 2013/0133275 A1 | 5/2013 | Bindschedler et al. |
| 2013/0139869 A1 | 6/2013 | Nuernberger et al. |
| 2013/0180568 A1 | 7/2013 | Hartelius |
| 2013/0206173 A1 | 8/2013 | Zijlstra |
| 2013/0206206 A1 | 8/2013 | Bjorneklett et al. |
| 2013/0239343 A1 | 9/2013 | Lacalle Bayo |
| 2013/0248478 A1 | 9/2013 | Wheeler et al. |
| 2013/0255167 A1 | 10/2013 | Concho et al. |
| 2013/0263914 A1 | 10/2013 | Crimmins et al. |
| 2013/0276304 A1 | 10/2013 | Flaherty et al. |
| 2013/0305518 A1 | 11/2013 | Adriani et al. |
| 2013/0319962 A1 | 12/2013 | Park et al. |
| 2013/0340807 A1 | 12/2013 | Gerwing et al. |
| 2014/0033511 A1 | 2/2014 | Swahn et al. |
| 2014/0069483 A1 | 3/2014 | Wolter et al. |
| 2014/0083249 A1 | 3/2014 | Michotte et Welle |
| 2014/0109334 A1* | 4/2014 | Saraf ............... B08B 1/008 15/246 |
| 2014/0174315 A1 | 6/2014 | Camp et al. |
| 2014/0202492 A1 | 7/2014 | Grossman |
| 2014/0310906 A1* | 10/2014 | Zanatta ............... F24J 2/461 15/246 |
| 2015/0200619 A1 | 7/2015 | Worden |
| 2015/0229265 A1 | 8/2015 | Miraikikai et al. |
| 2015/0316639 A1 | 11/2015 | Russ et al. |
| 2015/0330040 A1 | 11/2015 | Dobbs |
| 2016/0044843 A1 | 2/2016 | Swahn et al. |
| 2016/0365823 A1 | 12/2016 | French et al. |
| 2016/0365830 A1 | 12/2016 | Bailey et al. |
| 2017/0073911 A1 | 3/2017 | Holland et al. |

FOREIGN PATENT DOCUMENTS

| | | |
|---|---|---|
| CN | 203055930 | 7/2013 |
| DE | 202005003750 | 5/2005 |
| DE | 102009049926 | 4/2011 |
| EA | 200970984 | 6/2010 |
| EP | 2505934 | 10/2012 |
| EP | 2581687 | 4/2013 |
| FR | 2959555 | 11/2011 |
| JP | 54-23137 | 8/1979 |
| JP | 2-17200 | 2/1990 |
| JP | 07-018796 | 1/1995 |
| JP | 08-078715 | 3/1996 |
| JP | 2002-078648 A | 3/2002 |
| JP | 2004-140256 | 5/2004 |
| JP | 3160565 U | 7/2010 |
| KR | 10-1034192 * | 5/2011 |
| KR | 10-2011-0061166 * | 6/2011 |
| PH | 1-1998-00592 | 5/2001 |
| WO | WO 2004/079775 | 9/2004 |
| WO | WO 2006/117551 | 9/2006 |
| WO | WO 2006/117551 | 11/2006 |
| WO | WO 2010/054274 | 5/2010 |
| WO | WO 2010/136468 | 12/2010 |
| WO | WO 2010/145844 | 12/2010 |
| WO | WO 2012/003585 | 1/2012 |
| WO | WO 2012/107671 | 8/2012 |
| WO | 2012/168070 * | 12/2012 |
| WO | WO 2016/049710 | 4/2016 |

OTHER PUBLICATIONS

Chinese Patent Office, First Office Action for CN 201280023942.0, dated Mar. 20, 2015.
European Patent Office, Extended European Search Report for EP 12760313.2-1605 dated Mar. 25, 2015 (6 pages).
United States Patent and Trademark Office, Non final office action dated May 7, 2015 for U.S. Appl. 13/195,562 (17 pages).
United States Patent and Trademark Office, Non final office action dated Mar. 25, 2015 for U.S. Appl. No. 13/794,217 (16 pages).
Chinese Patent Office, First Office Action for CN 201380035248.5, dated Oct. 20, 2015, with English Translation.
Chinese Patent Office, Second Office Action for CN 201280023942.0, dated Feb. 14, 2016, with English translation.
United States Patent and Trademark Office, Final office action dated Aug. 26, 2015 for U.S. Appl. No. 13/091,960 (24 pages).
United States Patent and Trademark Office, Non-final office action dated Jan. 12, 2016 for U.S. Appl. No. 13/091,960 (22 pages).
United States Patent and Trademark Office, Notice of allowance dated Nov. 23, 2015 for U.S. Appl. No. 13/195,562 (17 pages).
United States Patent and Trademark Office, Notice of allowance dated Mar. 1, 2016 for U.S. Appl. No. 13/195,562 (15 pages).
United States Patent and Trademark Office, Final office action dated Nov. 20, 2015 for U.S. Appl. No. 13/421,740 (16 pages).
United States Patent and Trademark Office, Non final office action dated Mar. 2, 2016 for U.S. Appl. No. 13/421,740 (17 pages).

(56) References Cited

OTHER PUBLICATIONS

United States Patent and Trademark Office, Notice of Allowance dated Nov. 3, 2015 for U.S. Appl. No. 13/794,217 (5 pages).
United States Patent and Trademark Office, Notice of Allowance dated Mar. 28, 2016 for U.S. Appl. No. 13/794,217 (6 pages).
United States Patent and Trademark Office, Non final office action dated Dec. 7, 2015 for U.S. Appl. No. 14/481,678 (7 pages).
United States Patent and Trademark Office, Non final office action dated Dec. 31, 2015 for U.S. Appl. No. 14/050,237 (7 pages).
Patent Cooperation Treaty, International Search Report for PCT/US14/54916 dated Dec. 24, 2014 (2 pages).
Patent Cooperation Treaty, International Search Report for PCT/US14/53787 dated Jan. 12, 2015 (2 pages).
Patent Cooperation Treaty, Written Opinion of the International Searching Authority for PCT/US14/54916 dated Dec. 24, 2014 (9 pages).
Patent Cooperation Treaty, Written Opinion of the International Searching Authority for PCT/US14/53787 dated Jan. 12, 2015 (7 pages).
Patent Cooperation Treaty, International Search Report for PCT/US11/027700 dated May 3, 2011 (2 pages).
Patent Cooperation Treaty, Written Opinion of the International Searching Authority for PCT/US11/027700 dated May 3, 2011 (4 pages).
Patent Cooperation Treaty, International Search Report for PCT/US11/033722 dated Jul. 28, 2011 (2 pages).
Patent Cooperation Treaty, Written Opinion of the International Searching Authority for PCT/US11/033722 dated Jul. 28, 2011 (9 pages).
Patent Cooperation Treaty, International Search Report for PCT/US11/038094 dated Sep. 2, 2011 (2 pages).
Patent Cooperation Treaty, Written Opinion of the International Searching Authority for PCT/US11/038094 dated Sep. 2, 2011 (12 pages).
Patent Cooperation Treaty, International Search Report for PCT/US11/046175 dated Dec. 9, 2011 (2 pages).
Patent Cooperation Treaty, Written Opinion of the International Searching Authority for PCT/US11/046175 dated Dec. 9, 2011 (8 pages).
Patent Cooperation Treaty, International Search Report for PCT/US12/029345 dated Oct. 10, 2012 (4 pages).
Patent Cooperation Treaty, Written Opinion of the International Searching Authority for PCT/US12/029345 dated Oct. 10, 2012 (8 pages).
Patent Cooperation Treaty, International Search Report for PCT/US13/30416 dated Jun. 17, 2013 (2 pages).
Patent Cooperation Treaty, Written Opinion of the International Searching Authority for PCT/US13/30416 dated Jun. 17, 2013 (6 pages).
Patent Cooperation Treaty, International Search Report for PCT/US13/40500 dated Sep. 4, 2013 (2 pages).
Patent Cooperation Treaty, Written Opinion of the International Searching Authority for PCT/US13/40500 dated Sep. 4, 2013 (9 pages).
United States Patent and Trademark Office, Non final office action dated Nov. 8, 2012 for U.S. Appl. No. 13/043,286 (14 pages).
United States Patent and Trademark Office, Non final office action dated Jan. 10, 2014 for U.S Appl. No. 13/091,960 (21 pages).
United States Patent and Trademark Office, Non final office action dated Sep. 6, 2013 for U.S. Appl. No. 13/195,562 (15 pages).
United States Patent and Trademark Office, Final office action dated Oct. 7, 2014 for U.S. Appl. No. 13/195,562 (17 pages).
United States Patent and Trademark Office, Non final office action dated Mar. 24, 2014 for U.S. Appl. No. 13/195,562 (24 pages).
United States Patent and Trademark Office, Non final office action dated Sep. 24, 2014 for U.S. Appl. No. 13/421,740 (15 pages).
United States Patent and Trademark Office, Non final office action dated Aug. 8, 2013 for U.S. Appl. No. 13/421,740 (9 pages).
United States Patent and Trademark Office, Final office action dated Mar. 24, 2014 for U.S. Appl. No. 13/421,740 (12 pages).

United States Patent and Trademark Office, Non final office action dated Nov. 19, 2014 for U.S. Appl. No. 13/091,960 (26 pages).
Australian Patent Office, Patent Examination Report No. 1 for Application 2013263123, dated Jun. 30, 2016 (4 pages).
Kazakhstan Patent Office, Official Action for Application 2014/2546.1, dated Jul. 22, 2016.
Patent Office of the Cooperation Counsel of the Arab States of the Gulf, Examination Report for GC 2012-22216, dated Mar. 7, 2016 (5 pages).
Patent Cooperation Treaty, International Search Report for PCT/US2016/032459 dated Sep. 8, 2016 (4 pages).
Patent Cooperation Treaty, Written Opinion of the International Searching Authority for PCT/US2016/032459 dated Sep. 8, 2016 (7 pages).
Patent Cooperation Treaty, International Search Report for PCT/US2016/032464 dated Oct. 4, 2016 (4 pages).
Patent Cooperation Treaty, Written Opinion of the International Searching Authority for PCT/US2016/032464 dated Oct. 4, 2016 (7 pages).
United States Patent and Trademark Office, Notice of Allowance dated Sep. 29, 2016 for U.S. Appl. No. 13/421,740 (8 pages).
United States Patent and Trademark Office, Office Action dated Jun. 28, 2016 for U.S. Appl. No. 14/050,237 (13 pages).
United States Paient and Trademark Office, Office Action dated Jul. 12, 2016 for U.S. Appl. No. 13/892,140 (12 pages).
United States Patent and Trademark Office, Notice of Allowance dated Jun. 14, 2016 for U.S. Appl. No. 13/091,960 (9 pages).
United States Paient and Trademark Office, Notice of Allowance dated Jun. 7, 2016 for U.S. Appl. No. 14/481,678 (5 pages).
Array Technologies, Inc., Technical Datasheet for DuraTrack® HZ v3 (2 pages).
Exosun Inc., Technical Datasheet for exotrack® HZ v.2 (4 pages).
IDEEMATEC Deutschland GmbH, Product literature for safeTrack Horizon (6 pages).
Lovejoy, Inc., "Lovejoy Coupling Solutions" catalog of discs (28 pages).
Lovejoy, Inc., Technical Datasheet for Lovejoy 4 Bolt Disc Coupling (2 pages).
NEXTracker, Inc., Product literature for Self-Powered Tracking with NEXTrackerSPT (3 pages).
Optimum Tracker, Technical Datasheet for O-Track HZ (4 pages).
R+W America, Technical Datasheet for Ecolight® Elastomer Couplings (4 pages).
Youtube, "Soluzioni per lavaggio e pulizia fotovoltaico / Solar panel cleaning solutions / Lavaggio pannelli," 3:22 minute video uploaded to *YouTube* by Wash Panel, published on May 3, 2013, https://www.youtube.com/watch?v=b6duSZH1C9o , 7 pages (screen shots obtained on Aug. 11, 2016).
Chinese Patent Office, Examination Report for GC 2011-19056, dated May 27, 2017.
Japanese Patent Office, 2017, with English Translation First Office Action for JP 2015-512704 dated Jan. 31, 2017, with English Translation.
Chilean Patent Office, Official Action for Application No. 2014-003093, dated Oct. 10, 2017 (16 pages).
Chilean Patent Office, Official Action for Application No. 201600486, dated Nov. 7, 2017 (11 pages).
Patent Cooperation Treaty, International Search Report for PCT/US2016/050681 dated Dec. 15, 2016 (2 pages).
Patent Cooperation Treaty, Written Opinion of the International Searching Authority for PCT/US2016/050681 dated Dec. 15, 2016 (6 pages).
Patent Cooperation Treaty, International Search Report for PCT/US2016/062848 dated Feb. 16, 2017 (3 pages).
Patent Cooperation Treaty, Written Opinion of the International Searching Authority for PCT/US2016/062848 dated Feb. 16, 2017 (5 pages).
Patent Cooperation Treaty, International Search Report for PCT/US2017/040884 dated Nov. 6, 2017 (4 pages).
Patent Cooperation Treaty, Written Opinion of the International Searching Authority for PCT/US2017/040884 dated Nov. 6, 2017 (10 pages).

(56) References Cited

OTHER PUBLICATIONS

Patent Cooperation Treaty, International Search Report for PCT/US2017/032643 dated Sep. 15, 2017 (4 pages).
Patent Cooperation Treaty, Written Opinion of the International Searching Authority for PCT/US2017/032643 dated Sep. 15, 2017 (8 pages).
Patent Cooperation Treaty, International Search Report for PCT/US2017/040861 dated Oct. 31, 2017 (4 pages).
Patent Cooperation Treaty, Written Opinion of the International Searching Authority for PCT/US2017/040861 dated Oct. 31, 2017 (7 pages).
Patent Cooperation Treaty, International Search Report for PCT/US2017/040872 dated Sep. 8, 2017 (3 pages).
Patent Cooperation Treaty, Written Opinion of the International Searching Authority for PCT/US2017/040872 dated Sep. 8, 2017 (6 pages).
United States Patent and Trademark Office, Office Action dated Jun. 20, 2017 for U.S. Appl. No. 15/261,257 (11 pages).
United States Patent and Trademark Office, Office Action dated Feb. 15, 2017 for U.S. Appl. No. 15/085,864 (13 pages).
United States Patent and Trademark Office, Final Office Action dated Jul. 6, 2017 for U.S. Appl. No. 15/085,864 (15 pages).
United States Patent and Trademark Office, Office Action dated May 11, 2017 for U.S. Appl. No. 15/244,864 (7 pages).
United States Patent and Trademark Office, Notice of Allowance dated Dec. 7, 2017 for U.S. Appl. No. 15/244,864 (5 pages).
Cardwell, "A Staff of Robots Can Clean and Install Solar Panels," New York Times, Oct. 14, 2013 (4 pages).
Matt. "Fracking Ramp: An Essential Tool in Oil Field Services Fracking Boom"; Hand-Ramp; Website [online]. May 28, 2013 [retrieved Nov. 3, 2016]. Retrieved from the Internet: <URL: https://handiramp.com/blog/category/material-handling/page/2/>.
5B, Product literature for Maverick (3 pages).
Patent Office of the Cooperation Counsel of the Arab States of the Gulf, Examination Report for GC 2013-23845, dated Oct. 16, 2017 (6 pages).
Patent Office of the Cooperation Counsel of the Arab States of the Gulf, Examination Report for GC 2013-24392, dated Oct. 22, 2017 (7 pages).
Australian Patent Office, Official Action for Application No. 2014315407, dated Jan. 8, 2018 (3 pages).
Egyptian Patent Office, Official Action for Application No. PCT 333/2016, dated Dec. 12, 2017 (6 pages).
United States Patent and Trademark Office, Office Action dated Jan. 25, 2018 for U.S. Appl. No. 15/085,864 (20 pages).

\* cited by examiner

SYSTEMS, VEHICLES, AND METHODS FOR MAINTAINING RAIL-BASED ARRAYS OF PHOTOVOLTAIC MODULES

CROSS-REFERENCE TO RELATED APPLICATIONS

This application claims priority to U.S. Provisional Patent Application No. 61/874,290, filed on Sep. 5, 2013 and entitled "Maintenance Vehicles for Photovoltaic Modules," the entire contents of which are incorporated by reference herein for all purposes.

BACKGROUND

The present invention is directed to photovoltaic modules according to certain embodiments. More particularly, some embodiments of the invention provide systems, vehicles, and methods for maintaining rail-based arrays of photovoltaic modules. Merely by way of example, embodiments of the invention have been applied to cleaning rail-based arrays of photovoltaic modules. However, it would be recognized that the invention has a much broader range of applicability.

Photovoltaics convert sunlight into electricity, providing a desirable source of clean energy. FIG. 1 is a simplified diagram of a conventional photovoltaic array. The photovoltaic array 100 includes strings 1, 2, 3, 4, . . . n, where n is a positive integer larger than or equal to 1. Each string includes photovoltaic (PV) modules (e.g., solar panels) that are connected in series. The photovoltaic array 100 is connected to a central inverter 110, which provides an alternating current (AC) connection to a power grid 120. FIG. 2 is a simplified diagram of a conventional photovoltaic module. The photovoltaic (PV) module 210 includes a junction box 220 on the backside of the PV module 210.

The installation of photovoltaic arrays often presents logistical challenges. Not only does the site for the photovoltaic array need to be properly prepared, but large quantities of materials also need to be transported to and within the site. For example, the site for the photovoltaic array may have existing vegetation that would interfere with the installation and operation of the photovoltaic array. This vegetation usually has to be cleared. The site may also have uneven terrain that usually requires extensive grading and earth moving. Once the site is prepared, it is then often necessary to build an extensive infrastructure on which the strings of PV modules 210 are to be affixed. The PV modules 210 are then moved into position, affixed to the structure, and interconnected so that power can be delivered to the power grid 120. Each of these operations can be time-consuming and expensive.

Once the photovoltaic array is in operation, additional infrastructure often is used to support, maintain, evaluate, and repair the array. In order to support the operation of the photovoltaic array, equipment and materials routinely need to be transported from one end of the array to another. For example, the test equipment is transported to a PV module that is under evaluation. In another example, the cleaning equipment is transported to remove debris and dirt from the PV module. In yet another example, an additional module is transported as replacement for the defective module. Depending upon the terrain, soils, and weather, simply getting equipment and materials from one end of the array to another often poses significant challenges, especially if the ground is muddy. As with the installation, these operational needs can also be time-consuming and expensive.

Hence, it is highly desirable to improve techniques for installation and operation of photovoltaic arrays.

SUMMARY OF INVENTION

The present invention is directed to photovoltaic modules according to certain embodiments. More particularly, some embodiments of the invention provide systems, vehicles, and methods for maintaining rail-based arrays of photovoltaic modules. Merely by way of example, embodiments of the invention have been applied to cleaning rail-based arrays of photovoltaic modules. However, it would be recognized that the invention has a much broader range of applicability.

According one embodiment, a system for maintaining photovoltaic modules is provided. The system can include a first elongated rail including first and second support surfaces and a first mounting surface disposed between the first and second support surfaces, a first array of the photovoltaic modules being coupled to the first mounting surface and raised relative to the first and second support surfaces; and a first maintenance vehicle disposed on the first and second support surfaces, the first maintenance vehicle including a first cleaning head, a first actuator, a first motor, and first and second support legs. The first and second support legs can suspend the first cleaning head over the photovoltaic modules of the first array and can be movably coupled to the first and second support surfaces so as to laterally and sequentially move the first cleaning head in a direction parallel to the first elongated rail and across each of the photovoltaic modules of the first array responsive to actuation of the first motor. At least a portion of the first cleaning head can be vertically movable between a disengaged position spaced apart from the photovoltaic modules of the first array and a first engaged position in contact with at least one of the photovoltaic modules of the first array responsive to actuation of the first actuator.

According to another embodiment, a method for maintaining photovoltaic modules is provided. The method can include providing a first elongated rail including first and second support surfaces and a first mounting surface disposed between the first and second support surfaces, a first array of the photovoltaic modules being coupled to the first mounting surface and raised relative to the first and second support surfaces; disposing a first maintenance vehicle on the first and second support surfaces, the first maintenance vehicle including a first cleaning head, a first actuator, a first motor, and first and second support legs; suspending the first cleaning head over the photovoltaic modules of the first array using the first and second support legs, the first and second support legs being movably coupled to the first and second support surfaces so as to laterally and sequentially move the first cleaning head in a direction parallel to the first elongated rail and across each of the photovoltaic modules of the first array responsive to actuation of the first motor; and vertically moving at least a portion of the first cleaning head between a disengaged position spaced apart from the photovoltaic modules of the first array and a first engaged position in contact with at least one of the photovoltaic modules of the first array responsive to actuation of the first actuator.

Depending upon the embodiment, one or more benefits may be achieved. These benefits and various additional objects, features, and advantages of the present invention can be fully appreciated with reference to the detailed description and accompanying drawings that follow.

DETAILED DESCRIPTION

The present invention is directed to photovoltaic modules according to certain embodiments. More particularly, some embodiments of the invention provide systems, vehicles, and methods for maintaining rail-based arrays of photovoltaic modules. Merely by way of example, embodiments of the invention have been applied to cleaning rail-based arrays of photovoltaic modules. However, it would be recognized that the invention has a much broader range of applicability.

Illustratively, the rail-based arrays of photovoltaic modules with which the present systems, vehicles, and methods can be used can, in some embodiments, include an elongated rail including first and second support surfaces and a first mounting surface disposed between the first and second support surfaces. An array of the photovoltaic modules can be coupled to the first mounting surface and raised relative to the first and second support surfaces. Optionally, a plurality of such rails can be provided, and a corresponding array of photovoltaic modules can be coupled to at least one mounting surface of each such rail. For further details on exemplary rail-based arrays of photovoltaic modules, see commonly assigned U.S. Patent Publication Nos. 2011/0284057 and 2013/0068275, the entire contents of both of which are incorporated by reference herein.

Under one aspect of the present invention, a maintenance vehicle can be configured to be disposed on the first and second support surfaces of the elongated rail. The first maintenance vehicle can include a cleaning head, an actuator, a motor, and first and second support legs. In certain, non-limiting embodiments, the maintenance vehicle can be configured so as substantially to be supported only by the first and second support surfaces, rather than being supported by the photovoltaic modules themselves. As such, the maintenance vehicle can be moved along the array so as to clean the photovoltaic modules of the array, without imposing a significant load or torque on the photovoltaic modules themselves other than that associated with cleaning the modules, e.g., with a rotating brush that can be lowered into contact with the modules.

Figure 1:
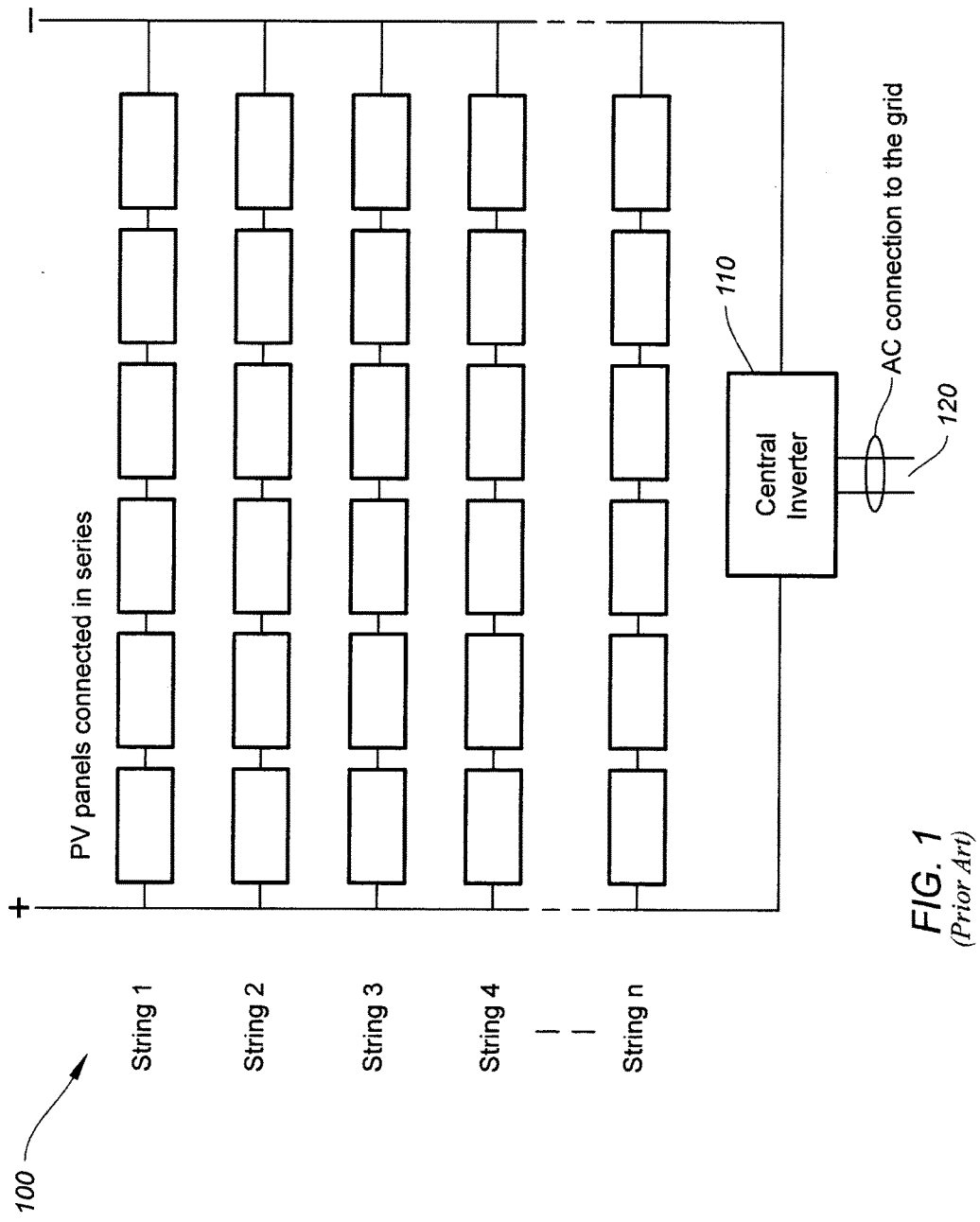
FIG. 1 is a simplified diagram of a conventional photovoltaic array.
Figure 2:
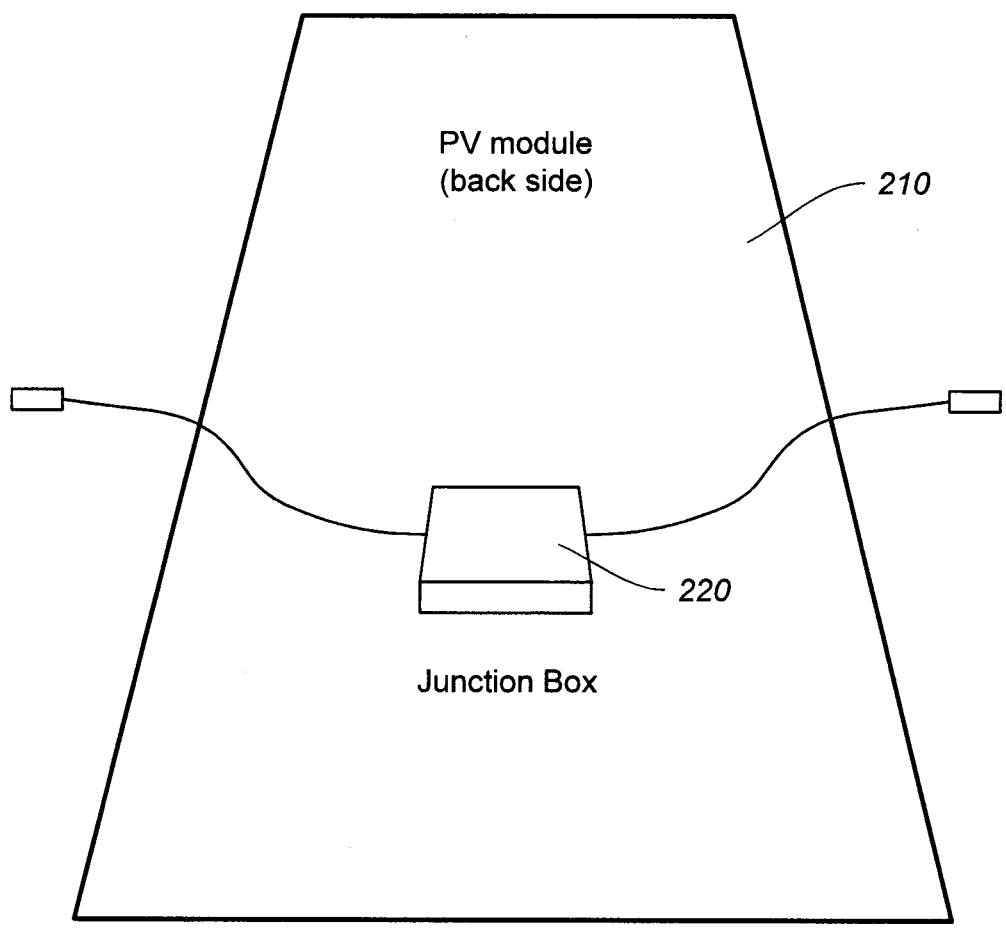
FIG. 2 is a simplified diagram of a conventional photovoltaic module.
Figure 3A:
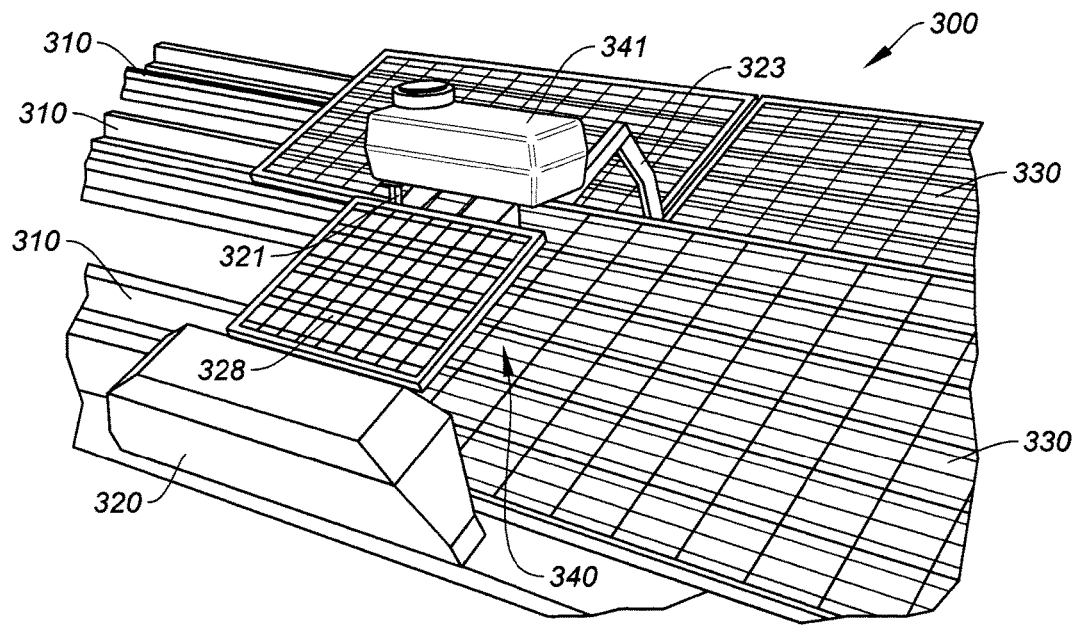
FIGS. 3A-3B are simplified diagrams showing perspective views of a maintenance system and vehicle for maintaining at least one rail based array of photovoltaic modules, according to certain embodiments.
Figure 3B:
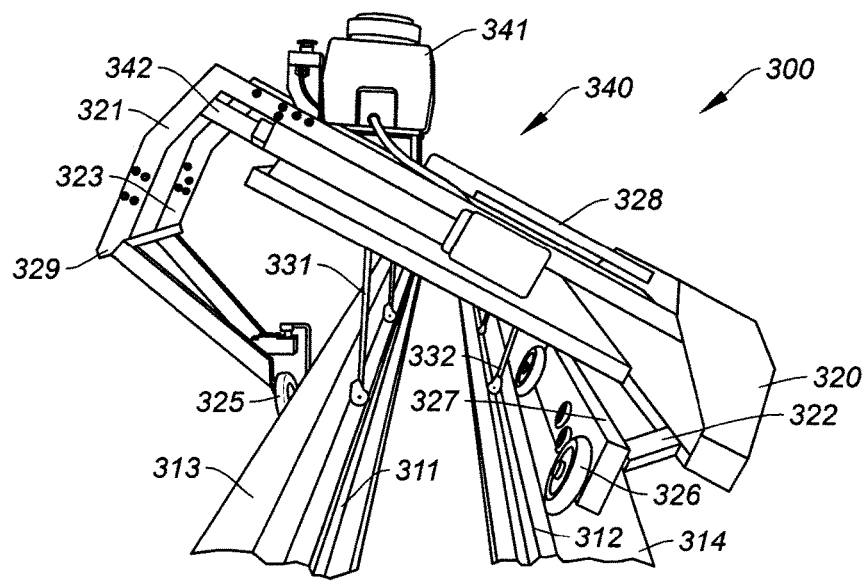

FIGS. 3A-3B are simplified diagrams showing perspective views of a maintenance system and vehicle for maintaining at least one rail based array of photovoltaic modules, according to certain embodiments. These diagrams are merely an example, which should not unduly limit the scope of the claims. One of ordinary skill in the art would recognize many variations, alternatives, and modifications.

System 300 illustrated in FIGS. 3A-3B includes elongated rail 310 and maintenance vehicle 320 for maintaining photovoltaic modules 330, such as solar panels. Elongated rail 310 can include one or more mounting surfaces, e.g., mounting surfaces 311 and 312, that can serve as a mechanical substrate for mounting an array of photovoltaic modules 330. For example, as can be seen in FIG. 3B, photovoltaic module 330 can include one or more legs 331, 332 that couple to the one or more mounting surfaces of elongated rail 310. For example, photovoltaic module 330 can include at least one leg that engages a first recess defined in elongated rail 310 that defines a first mounting surface 311, and at least one leg that engages a second recess defined in elongated rail 310 that defines a second mounting surface 312. Optionally, the one or more legs are coupled to the one or more mounting surfaces using adhesive. Illustratively, the PV modules 330 can be or can include a glass-to-glass module. Additionally, or alternatively, the one or more mounting surfaces of elongated rail 310 or the legs 331, 332 of photovoltaic module 330, or both, can be configured such that the photovoltaic module is disposed at a tilt angle. For example, the tilt angle varies depending upon the geographic location (e.g., latitude or orientation) of the photovoltaic module 330 so as to enhance the modules' energy capture from the light source (e.g., the sun).

Elongated rail 310 also can include one or more support surfaces, e.g., support surfaces 313 and 314, that can serve as a mechanical support for maintenance vehicle 320 such that the maintenance vehicle can move along and in a direction parallel to the elongated rail, e.g., while cleaning photovoltaic modules 330. In the illustrated embodiment, the one or more mounting surfaces, e.g., mounting surfaces 311 and 312, are disposed between the one or more support surfaces, e.g., support surfaces 313 and 314. Additionally, or alternatively, photovoltaic modules 330 are raised relative to the one or more support surfaces, e.g., support surfaces 313 and 314. In certain embodiments, first and second vehicle support surfaces 313, 314 and the at least one mounting surface, e.g., mounting surfaces 311, 312, are integrally formed with one another of a common material shaped so as to define each such surface. Additionally, or alternatively, the first and second vehicle support surfaces and the at least one mounting surface can be integrally formed of extruded concrete disposed on the ground. In one example, elongated rail 310 is constructed from concrete, or is constructed on site (e.g., being extruded in place using a slip-form extrusion machine), or both.

Optionally, a plurality of elongated rails 310 optionally can be provided, each including one or more mounting surfaces to which photovoltaic modules 330 can be coupled, and one or more support surfaces that can serve as a mechanical support for maintenance vehicle 320. As described in greater detail below with reference to FIGS. 6A-6C, the same maintenance vehicle 320 can be used to maintain the photovoltaic modules 330 coupled to those elongated rails 310; alternatively, a different maintenance vehicle 320 can be provided corresponding to each elongated rail so as respectively to maintain the photovoltaic modules coupled to only one of such rails. For example, in one embodiment, one vehicle is used per row of solar panels. In yet another embodiment, one maintenance vehicle is moved between rows by mechanism. In yet another example, the maintenance vehicle uses one or more limit switches to detect end-of-row.

As illustrated in FIGS. 3A-3B, maintenance vehicle 320 for photovoltaic modules 330, such as solar panels, is disposed on and movably coupled to the one or more support surfaces of elongated rail 310, e.g., can be disposed on first support surface 313 and second support surface 314. For example, the maintenance vehicle rolls on an extruded concrete rail. Maintenance vehicle 320 can include one or more support legs, e.g., first and second support legs 321 and 322, and optionally can include three or more support legs, e.g., first support leg 321, second support leg 322, third support leg 323, and fourth support leg (not specifically illustrated), as shown in the exemplary embodiment illustrated in FIGS. 3A-3B. The one or more support legs respectively can be coupled to one or more wheels, caterpillar treads, or the like permitting locomotion of maintenance vehicle 320 along the one or more support surfaces of elongated rail 310 in a direction parallel to the elongated rail. For example, in the embodiment illustrated in FIGS. 3A-3B, support leg 321 can be coupled to one or more wheels 325 that are movably disposed on, e.g., can contact and move along, first support surface 313, and support leg 322 can be coupled to one or more wheels 326 that are movably disposed on, e.g., can contact and move along, second support surface 314. In one illustrative embodiment, maintenance vehicle 320 further can include a third support leg, e.g., leg 323, that is movably coupled to one of the first and second support surfaces 313, 314, e.g., by a third wheel that is movably disposed on, e.g., can contact and move along, that support surface.

In yet another example, the maintenance vehicle includes one or more adjustable frames to accommodate one or more panel angles. For example, in some embodiments, at least one of the support legs is adjustable so as to accommodate photovoltaic modules at different angles than one another. For example, in the embodiment illustrated in FIGS. 3A-3B, support legs 321, 323 each include a joint 329 the angle of which can be increased or decreased (e.g., automatically with an actuator, not illustrated or manually) so as to modify the relative angle of one or more portions of maintenance vehicle relative to photovoltaic modules 330.

Figure 6A:
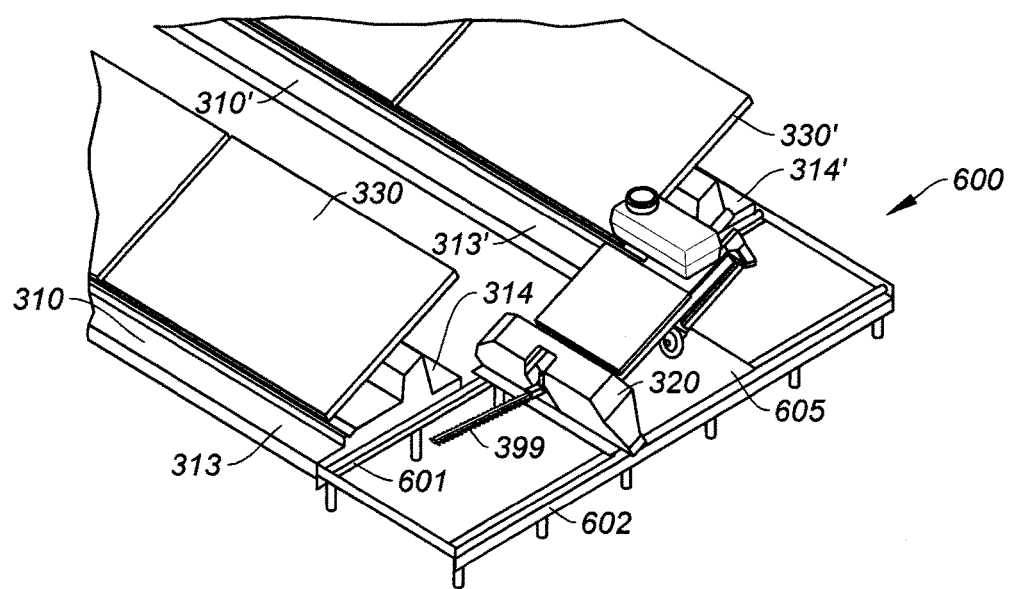
FIG. 6A is a simplified diagram showing a perspective view of an exemplary rail-to-rail mechanism for moving a maintenance vehicle from a first rail based array of photovoltaic modules to a second rail based array of photovoltaic modules, according to certain embodiments.
Figure 6B:
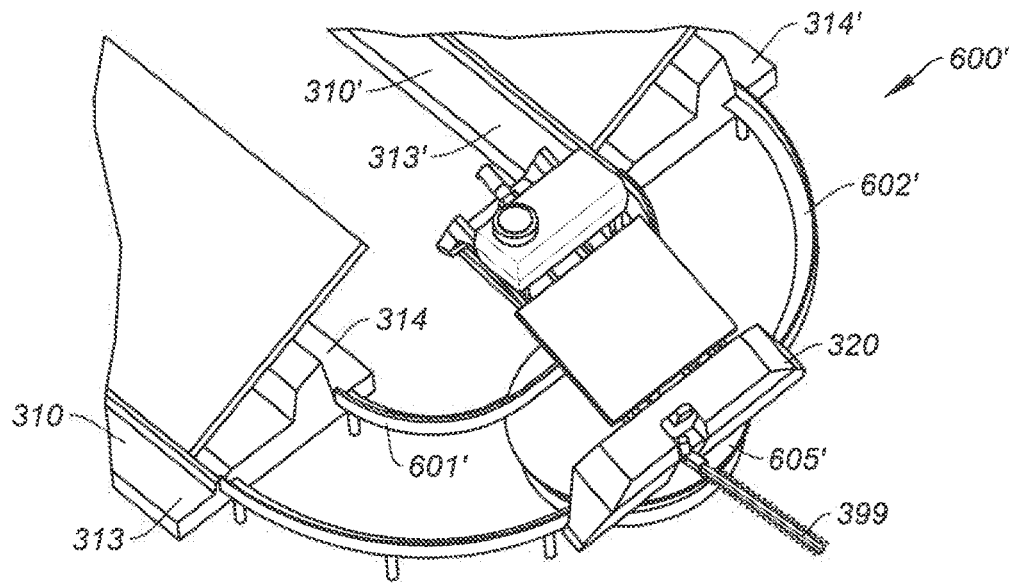
FIG. 6B is a simplified diagram showing a perspective view of another exemplary rail-to-rail mechanism for moving a maintenance vehicle from a first rail based array of photovoltaic modules to a second rail based array of photovoltaic modules, according to certain embodiments.
Figure 6C:
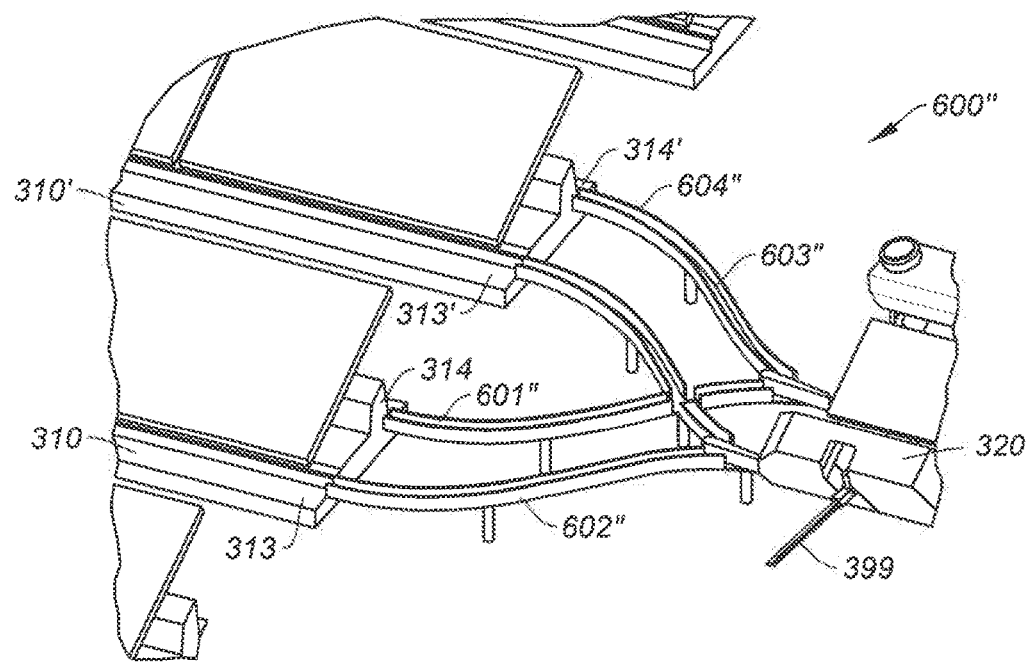
FIG. 6C is a simplified diagram showing a perspective view of yet another exemplary rail-to-rail mechanism for moving a maintenance vehicle from a first rail based array of photovoltaic modules to a second rail based array of photovoltaic modules, according to certain embodiments.

Maintenance vehicle 320 also can include first motor 327 configured to laterally and sequentially move the vehicle in a direction parallel to elongated rail 310 and across each of the photovoltaic modules 330 in the array responsive to actuation of first motor 327. First motor 327 can be powered by any suitable fuel source, e.g., can include a combustion motor, an electric motor, or the like. In one example, the maintenance vehicle is charged by one or more solar panels. For example, in the embodiment illustrated in FIGS. 3A-3B, maintenance vehicle 320 further can include a power source such as solar panel 328 or a battery (not specifically illustrated) configured to provide power to first motor 327, and optionally also to one or more other motors or actuators of vehicle 320 such as those described elsewhere herein. In one embodiment, solar panel 328 is operably coupled to a battery so as to charge the battery and optionally also provide power to maintenance vehicle 320 during daylight hours, and then battery can continue to provide power to maintenance vehicle 320 at times when solar panel 328 provides insufficient power, e.g., during nighttime hours. Illustratively, maintenance vehicle 320 can include a controller to which motor 327 can be coupled via a motor control cable (controller and cable not shown in FIGS. 3A-3B). In one embodiment, the maintenance vehicle is dispatched by wireless control. For example, the wireless control is managed by web interface. Illustratively, the controller of maintenance vehicle 320 can be in wired or wireless communication with a remote computer via which a user can enter commands to maintenance vehicle 320, e.g., by a web interface. Such wireless communication with a remote computer can utilize, for example, WiFi, WiMax, Bluetooth, a cellular connection, or other suitable wireless connection. In one illustrative embodiment, maintenance vehicle 320 includes antenna 399 such as illustrated in FIGS. 6A-6C.

Maintenance vehicle 320 also can include cleaning head 340 such as described in greater detail with reference to FIGS. 4A-5C. In certain, non-limiting embodiments, the first and second support legs can suspend the cleaning head over the photovoltaic modules of the array. First and second support legs 321, 322 of maintenance vehicle 320 can movably couple cleaning head 340 to the one or more support surfaces of elongated rail 310 such that the cleaning head can be laterally and sequentially moved in a direction parallel to the elongated rail and across each of the photovoltaic modules 330 of the array responsive to actuation of motor 327. Additionally, as described in greater detail with reference to FIGS. 4A-5C, at least a portion of cleaning head 340 can be vertically movable between a disengaged position spaced apart from photovoltaic modules 330 of the array and one or more engaged positions in contact with at least one of the photovoltaic modules of the array responsive to actuation of an actuator. In one nonlimiting, illustrative embodiment, at least a portion of cleaning head 340 has a substantially fixed position relative to first and second support legs 321, 322, and at least a portion of cleaning head 340 is vertically movable relative to other portions of cleaning head 340 and relative to one or more photovoltaic modules 330. In other embodiments, the entirety of cleaning head 340 is vertically movable relative to first and second support surfaces 313, 314 and relative to one or more photovoltaic modules 330.

As described in greater detail with reference to FIGS. 4A-5C, cleaning head 340 can include second motor 342, and the at least a portion of cleaning head 340 can include a brush (not shown in FIGS. 3A-3B) movable to contact at least one of the photovoltaic modules 330 of the array in at least one engaged position responsive to actuation of an actuator (not shown in FIGS. 3A-3B). The brush can be rotatable along an axis parallel to the photovoltaic modules 330 of the array responsive to actuation of second motor 342. Additionally, or alternatively, and in certain embodiments, such as illustrated in FIGS. 3A-3B, cleaning head 340 can include fluid reservoir 341 and a second actuator (not shown in FIGS. 3A-3B). Cleaning head 340 can be operable to dispense fluid from the fluid reservoir onto at least one of photovoltaic modules 330 of the array responsive to actuation of the second actuator. In one example, the maintenance vehicle uses gravity fed water. Optionally, as described with reference to FIGS. 4A-5C, cleaning head 340 can include a wiper in contact with at least one photovoltaic module 330 of the array when the at least a portion of the first cleaning head is in an engaged position, and operable to at least partially dry that photovoltaic module.

In yet another embodiment, the maintenance vehicle includes one or more trimmer mechanisms to remove vegetation. Exemplary trimmer mechanisms suitable for use in maintenance vehicle 320 include string trimmers, hedge trimmers, pole saws, tillers, harrows, plows, and the like (not specifically illustrated in FIGS. 3A-3B), and can be powered by electricity or combustion, or by the motion of maintenance vehicle 320.

As noted further above, at least a portion of cleaning head 340 can be vertically movable between a disengaged position spaced apart from photovoltaic modules 330 of the array and one or more engaged positions in contact with at least one of the photovoltaic modules 330 responsive to actuation of an actuator. In one illustrative embodiment, maintenance vehicle 320 includes a three-position cleaning head and actuator. Additionally, in one embodiment, the cleaning head can include a brush and a wiper or squeegee. In one embodiment, the three-position cleaning head has the following three positions:

Raised position: there is no contact with the panel;

Middle position: there is contact of the brush to the panel; and

Lowered position: there is contact of brush and squeegee with panel.

In another embodiment, the three-position cleaning head is actuated by cable. For example, a cable is used to connect the actuator to the cleaning head, allowing wheels to roll over the surface of the panel and control height.

Figure 4A:
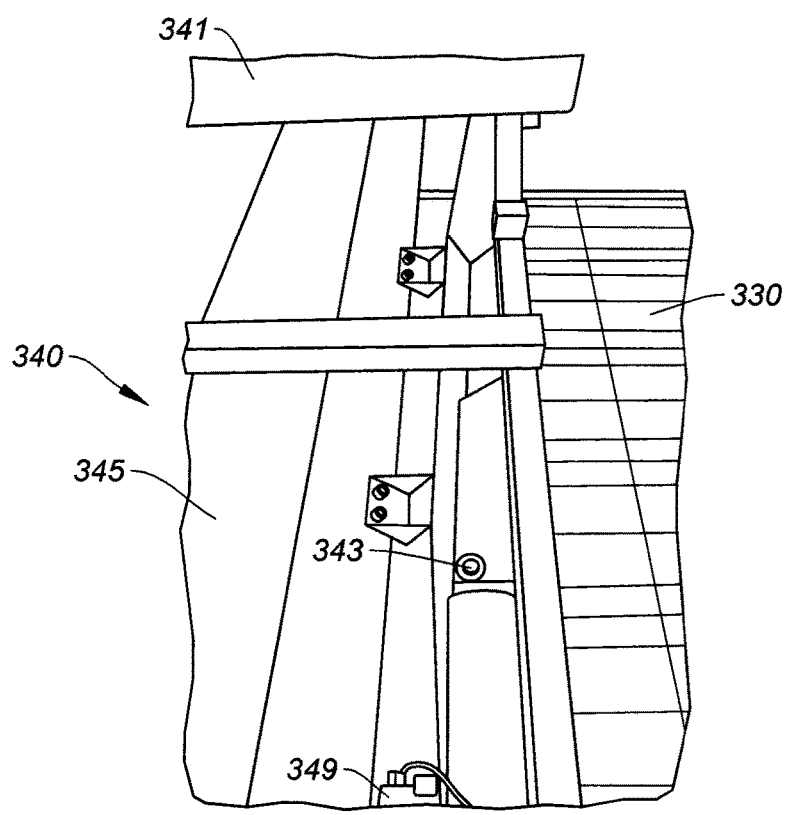
FIGS. 4A-4B are simplified diagrams showing perspective views of a cleaning head and actuator in a first position, according to certain embodiments.
Figure 4B:
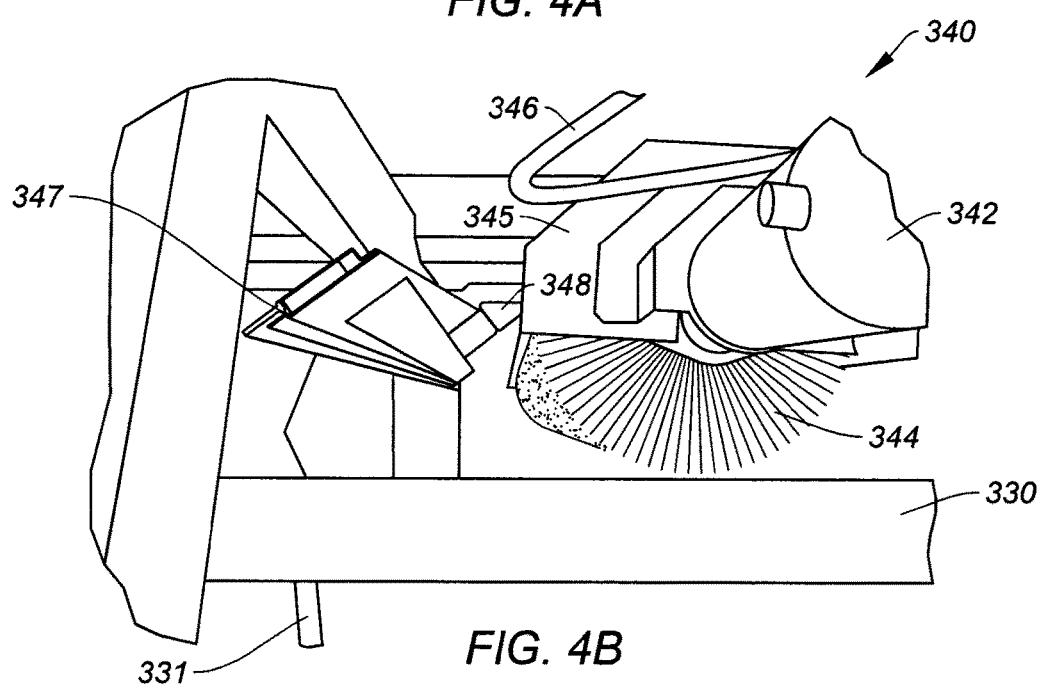

For example, FIGS. 4A-4B are simplified diagrams showing perspective views of a cleaning head and actuator in a first position, according to certain embodiments. These diagrams are merely an example, which should not unduly limit the scope of the claims. One of ordinary skill in the art would recognize many variations, alternatives, and modifications. In one example, FIGS. 4A-4B illustrate a three-position cleaning head 340 in a raised position. Cleaning head 340 includes fluid reservoir 341, motor 342, first actuator 343, brush 344, shield 345, motor control cable 346, wiper or squeegee 347, and actuator control cable 349. Fluid reservoir 341 is configured so as to dispense fluid, such as water or other cleaning liquid, onto photovoltaic module 330 or onto brush 344 via a fluid tube, optionally responsive to actuation of a second actuator (fluid tube and second actuator not shown in FIGS. 4A-4B). The fluid can be dispensed from fluid reservoir 341 under the force of gravity, e.g., responsive to the second actuator opening a valve permitting the fluid to drip onto brush 344 or photovoltaic module 330 via the fluid tube. Alternatively, the second actuator can pump the fluid from fluid reservoir 341 onto brush 344 or photovoltaic module 330 via the fluid tube, e.g., can spray or jet the fluid onto brush 344 or photovoltaic module 330.

Motor 342 is configured so as to rotate brush 344 along an axis parallel to photovoltaic module 330. Motor 342 can include, for example, an electric motor or a combustion motor. In one illustrative embodiment, motor 342 shares a common power source with motor 327 described above with reference to FIGS. 3A-3B, such as solar panel 328 or a battery. Motor 342 can be connected to a controller such as described elsewhere herein via motor control cable 346.

First actuator 343 is configured so as to vertically move at least a portion of cleaning head 340, e.g., at least brush 344 and wiper or squeegee 347, between a raised or disengaged position such as illustrated in FIGS. 4A-4B and one or more engaged positions such as described further below with reference to FIGS. 5A-5C. First actuator 343 can include, for example, a hydraulic actuator, a pneumatic actuator, an electric actuator, or mechanical actuator. In one illustrative embodiment, first actuator shares a common power source with motor 327 described above with reference to FIGS. 3A-3B, such as solar panel 328 or a battery. First actuator 343 can be connected to a controller such as described elsewhere herein via actuator control cable 349.

Brush 344 can include a plurality of bristles that extend substantially radially from a central rod coupled to motor 342 (rod not shown in FIGS. 4A-4B). The plurality of bristles can include a material of sufficient strength and stiffness such that rotation of the bristles against photovoltaic module 330, optionally in the presence of fluid disposed from fluid reservoir 341, can remove debris, dust, or dirt from photovoltaic module 330, with sufficient softness and flexibility as to do so substantially without damaging the photovoltaic module. Exemplary materials that can be suitable for use in the bristles of brush 344 include nylon and polypropylene. Shield 345 can include a flat or shaped metal or plastic sheet that partially surrounds brush 344 so as to inhibit the rotation of brush 344 from flicking debris, dust, or dirt onto a different portion of photovoltaic module 330 or an adjacent photovoltaic module when brush 344 is rotating and in contact with photovoltaic module 330, e.g., as described in greater detail below with reference to FIGS. 5A-5C.

Wiper or squeegee 347 can include a flexible hydrophilic material, such as natural rubber, silicone rubber, or other polymer such as ethylene propylene diene monomer (EPDM). Wiper or squeegee 347 can be configured so as to be oriented substantially parallel to and out of contact with photovoltaic module 330 in the raised position such as illustrated in FIGS. 4A-4B. For example, wiper or squeegee 347 can include pivot stop/panel rotation stop 348. FIGS. 4A-4B illustrate an exemplary position that includes, e.g., cleaning head in raised position, where neither brush not squeegee contacts glass surface of solar panel. For example, the squeegee position is aligned to brush head by one or more pivot stop, such as one or more panel rotation stops.

Figure 5A:
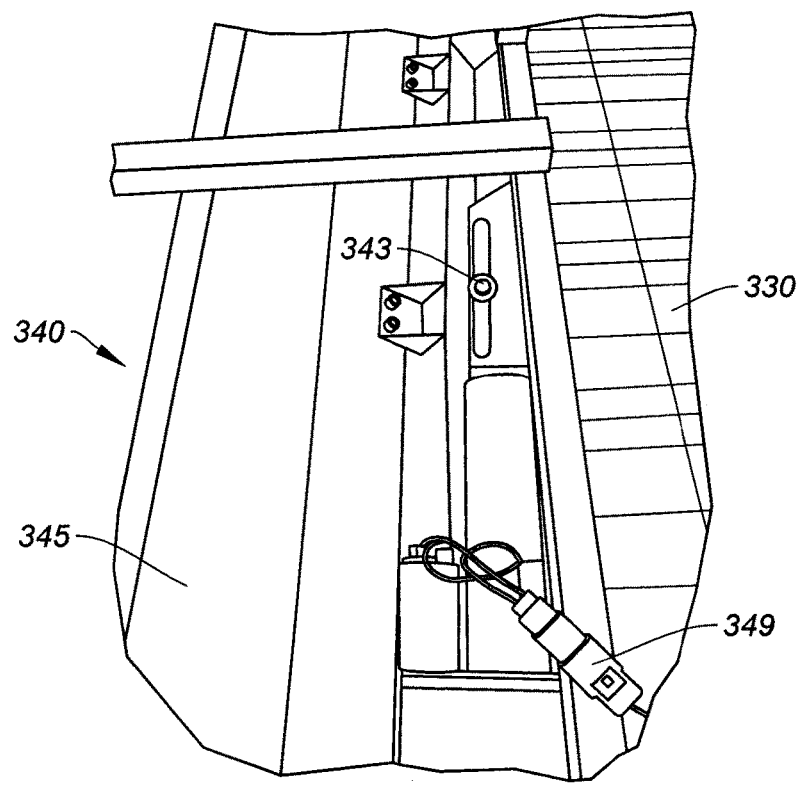
FIG. 5A-5C are simplified diagrams showing perspective views of a cleaning head and actuator in a second position, according to certain embodiments.
Figure 5B:
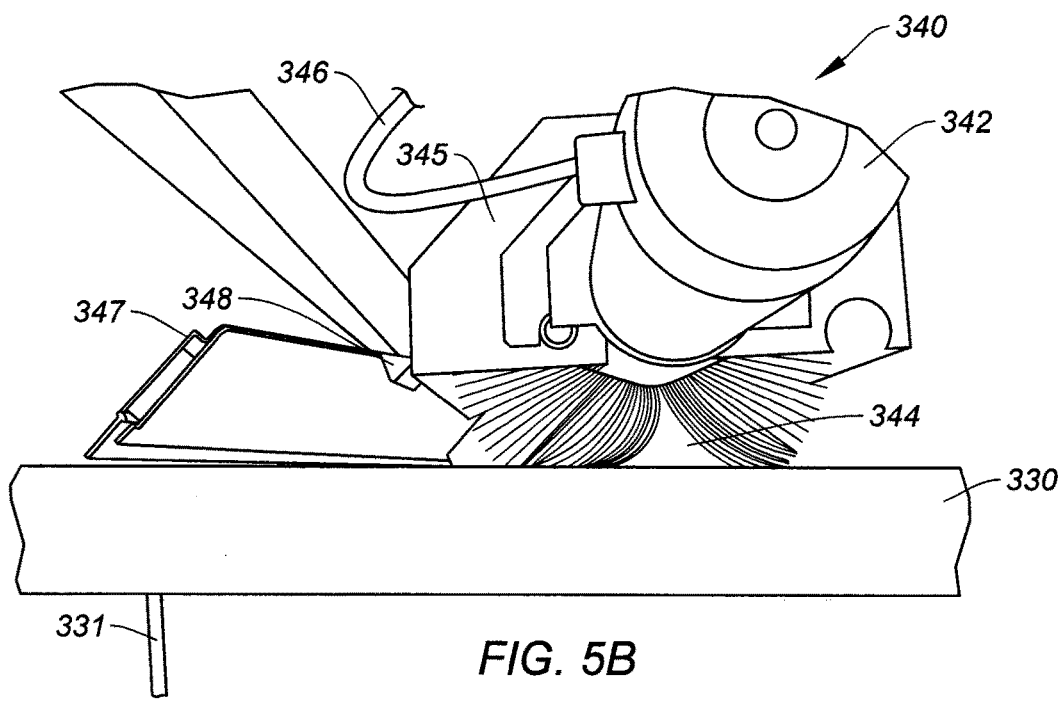
Figure 5C:
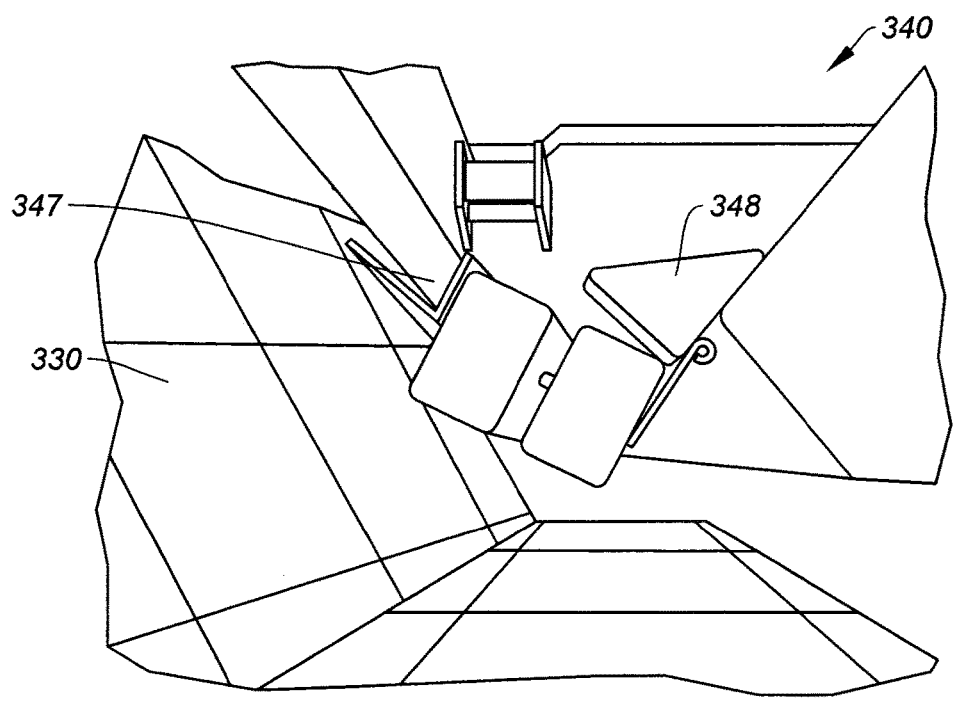

FIG. 5A-5C are simplified diagrams showing perspective views of a cleaning head and actuator in a second position, according to certain embodiments. These diagrams are merely an example, which should not unduly limit the scope of the claims. One of ordinary skill in the art would recognize many variations, alternatives, and modifications. FIGS. 5A-5C illustrate, e.g., cleaning head in lowered position and actuator, e.g., cleaning head in lowered position where brush and squeegee both contact glass surface of solar panel. For example, responsive to actuation of actuator 343 via actuation control cable 349, either brush 344 or both brush 344 and wiper or squeegee 347 can be lowered into contact with photovoltaic module 330. For example, at least a portion of cleaning head 320 (e.g., brush 344 and wiper or squeegee 347) can be vertically movable, responsive to actuation of actuator 343, to a first engaged position (e.g., lowered position) in which both the brush and the wiper or squeegee contact photovoltaic module 330 of the array. Additionally, or alternatively, at least a portion of cleaning head 320 (e.g., brush 344 and wiper or squeegee 347) can be vertically movable, responsive to actuation of actuator 343, to a second engaged position (e.g., middle position) in which the brush contacts photovoltaic module 330 of the array and the wiper does not contact the array. The first and second engaged positions can be discrete positions. Depending on which portion(s) of cleaning head 320 are moved so as to contact photovoltaic module 330, e.g., either brush 344 or both brush 344 and wiper or squeegee 347, such portion(s) can be moved laterally and sequentially in a direction parallel to elongated rail 310 and across each of the photovoltaic modules 330 of the array responsive to actuation of motor 327 such as discussed above with reference to FIGS. 3A-3B.

Additionally, responsive to actuation of motor 342 via motor control cable 346, brush 344 can be rotated so as to clean the surface of photovoltaic module 330. For example, the bristles of brush 344 can sweep debris, dirt, or dust off of the surface of photovoltaic module 330. Additionally, fluid from fluid reservoir 341 can be dispensed onto brush 344 or onto photovoltaic module 330, which can facilitate cleaning photovoltaic module 330. For example, as illustrated in FIGS. 3A-3B, photovoltaic module 330 can be disposed at a panel angle. Fluid dispensed from fluid reservoir 341 can collect the debris, dirt, or dust swept off of the surface of photovoltaic module 330, and the fluid then can flow to the bottom of module 330 under the force of gravity due to the panel angle of module 330. Additionally, or alternatively, in embodiments in which both brush 344 and wiper or squeegee 347 are in a position in which they are brought into contact with a photovoltaic module 330 and then moved laterally and sequentially in a direction parallel to elongated rail 310 and across photovoltaic modules 330 of the array, wiper or squeegee 347 can at least partially dry those modules. Additionally, or alternatively, in the lowered position, the one or more panel rotation stops are free of the squeegee, allowing the squeegee to follow glass surface of the solar panel. For example, as shown in FIG. 3C, panel rotation stop 348 can allow wiper or squeegee 347 to obtain one or more angles so as to follow a corresponding angled surface of photovoltaic module 330. According to certain embodiments, in the raised position and the middle position, the one or more panel rotation stops are engaged when the squeegee is lifted, aligning the squeegee to be parallel with surface of the panel.

Note that each of the various actuators and motors that can be included in maintenance vehicle 320 optionally can be powered by a common power source as one another, e.g., each can be powered by a common solar panel 328 or a common battery of vehicle 320. Alternatively, some of the actuators and motors can share a first common power source with one another, and others of the actuators and motors can share a second common power source with one another. Alternatively, each actuator and each motor can include its own power source.

Additionally, note that each of the various actuators and motors that can be included in maintenance vehicle 320 optionally can be controlled by a common controller as one another, e.g., each can be suitably connected to (such as by respective cabling) and controlled by a common controller of vehicle 320 that can be in wired or wireless communication with a remote computer that includes an interface by which a user may enter instructions, e.g., a web interface, that can be transmitted via an appropriate signal to the controller for implementation. The controller can include a memory and a processor coupled to the memory. The memory can store instructions for causing the processor to receive the instructions from the remote computer and then suitably to implement the instructions.

Illustratively, such instructions can include a speed of motor 327, which can control the rate at which cleaning head 340 passes over the photovoltaic modules 330 of the array and the start and stop times of motor 327 or rules defining when motor 327 should automatically start and stop; a speed of motor 342, which can control the rate at which brush 344 rotates and the start and stop times of motor 342 or rules defining when motor 342 should automatically start and stop; a speed of actuator 343, which can control the rate at which brush 344 and wiper or squeegee 347 can be moved vertically relative to the photovoltaic modules 330 and the start and stop times of actuator 343 or rules defining when actuator 343 should automatically start and stop; or a speed of the second actuator that controls dispensing of fluid from the fluid reservoir onto brush 344 or at least one of photovoltaic modules 330 of the array and the start and stop times of the second actuator or rules defining when the second actuator should automatically start and stop. Additionally, or alternatively, maintenance vehicle 320 can include a limit switch configured to detect one or both ends of elongated rail 310. The limit switch can be in operable communication with the controller.

In one illustrative, nonlimiting example, the controller suitably is programmed (e.g., remotely, such as by web interface) so as to detect a first end of elongated rail 310 based on a signal from a limit switch, and responsive to such detection, to actuate actuator 343 so as to lower brush 344 and optionally also wiper or squeegee 347 from a disengaged position into an engaged position. The controller also can be programmed so as to detect that actuator 343 properly positioned brush 344 and optionally also wiper or squeegee 347, and responsive to such detection, to actuate motor 342 so as to rotate brush 344 and to actuate the second actuator (not illustrated) so as to dispense fluid from fluid reservoir 341 onto brush 344 or photovoltaic module 330. The controller also can be programmed so as to detect that brush 344 properly is rotating and that fluid properly is being or has been dispensed, and responsive to such detection, to actuate motor 327 so as to laterally move maintenance vehicle 320, and thus to move brush 344 and optionally also wiper or squeegee 347, across the photovoltaic modules 330 of the array. The controller also can be programmed so as to detect a second end of elongated rail 310 based on a signal from the limit switch, and responsive to such detection, to actuate actuator 343 so as to raise brush 344 and optionally also wiper or squeegee 347 from the engaged position into a disengaged position, to terminate actuation of motor 342 so as to stop rotation of brush 344, and to terminate actuation of motor 327 so as to stop lateral movement of vehicle 320.

Additionally, as noted further above with reference to FIGS. 3A-3B, system 300 can include a plurality of elongated rails 310, each of which can include one or more support surfaces and one or more mounting surfaces to which a respective array of photovoltaic modules 330 can be coupled. For example, a first elongated rail can include first and second support surfaces and a first mounting surface to which is coupled a first array of photovoltaic modules that are raised relative to the first and second support surfaces, and a second elongated rail can include third and fourth support surfaces and a second mounting surface to which is coupled a second array of photovoltaic modules that are raised relative to the third and fourth support surfaces. Different maintenance vehicles can be provided and used so as to maintain the first and second arrays of photovoltaic modules. For example, a first maintenance vehicle such as described above with reference to FIGS. 3A-5C can be disposed on the first and second support surfaces of the first elongated rail so as to maintain the first array of photovoltaic modules, and a second maintenance vehicle also such as described above with reference to FIGS. 3A-5C can be disposed on the third and fourth support surfaces of the second elongated rail so as to maintain the second array of photovoltaic modules.

Alternatively, one maintenance vehicle can be moved between rows by mechanism. For example, the system can include a row-to-row mechanism configured to move a maintenance vehicle from the first elongated rail to the second elongated rail. Illustratively, such a row-to-row mechanism can include at least one track that couples the first support surface of the first elongated rail to one of the third and fourth support surfaces of the second elongated rail, and that couples the second support surface of the first elongated rail to the other of the third and fourth support surfaces of the second elongated rail. In one embodiment, the row-to-row mechanism moves one maintenance vehicle to service two or more rows of solar panels. For example, the row-to-row mechanism is actuated by the maintenance vehicle. In another example, the row-to-row mechanism is actuated by a dedicated drive located on the ground with an independent power supply. In another embodiment, one or more solar panels are used to charge the row-to-row mechanism. In yet another embodiment, the row-to-row mechanism is dispatched based on presence of one or more maintenance vehicles. In yet another embodiment, the row-to-row mechanism is dispatched based on centralized wireless control.

In one illustrative, nonlimiting example, FIG. 6A is a simplified diagram showing a perspective view of an exemplary rail-to-rail mechanism for moving a maintenance vehicle from a first rail based array of photovoltaic modules to a second rail based array of photovoltaic modules, according to certain embodiments, e.g., row-to-row mechanism for moving the maintenance vehicle from one row to the next row of solar panels. This diagram is merely an example, which should not unduly limit the scope of the claims. One of ordinary skill in the art would recognize many variations, alternatives, and modifications. Rail-to-rail mechanism 600 illustrated in FIG. 6A includes first track 601, second track 602, and optional platform 605. Upon reaching the end of first elongated rail 310 including first support surface 313 and second support surface 314 to which maintenance vehicle 320 is movably coupled, the maintenance vehicle can move off of the end of first elongated rail 310 and either directly onto first and second tracks 601, 602 or onto optional platform 605 that can be supported by first and second tracks 601, 602. Maintenance vehicle 320 can travel along first and second tracks 601, 602, or can be moved by optional platform 605 along first and second tracks 601, 602, towards and into alignment with the end of second elongated rail 310' including third support surface 313' and fourth support surface 314'. Maintenance vehicle 320 can travel off of first and second tracks 601, 602 or off of optional platform 605 onto the third support surface 313' and fourth support surface 314' of second elongated rail 310' so as to maintain photovoltaic modules 330 of second elongated rail 310'. In the embodiment illustrated in FIG. 6A, first track 601 can be considered to couple first support surface 313 to third support surface 313', and second track 602 can be considered to couple second support surface 314 to fourth support surface 314'. Other configurations are possible.

For example, FIG. 6B is a simplified diagram showing a perspective view of another exemplary rail-to-rail mechanism for moving a maintenance vehicle from a first rail based array of photovoltaic modules to a second rail based array of photovoltaic modules, according to certain embodiments, e.g., a row-to-row track for moving the maintenance vehicle from one row to the next row of solar panels. This diagram is merely an example, which should not unduly limit the scope of the claims. One of ordinary skill in the art would recognize many variations, alternatives, and modifications. For example, the row-to-row track allows connection between two rows to maintain correct south-facing orientation. Rail-to-rail mechanism 600' illustrated in FIG. 6B includes first track 601', second track 602', and optional platform 605'. Upon reaching the end of first elongated rail 310 including first support surface 313 and second support surface 314 to which maintenance vehicle 320 is movably coupled, the maintenance vehicle can move off of the end of first elongated rail 310 and either directly onto first and second tracks 601', 602' or onto optional platform 605' that can be supported by first and second tracks 601', 602'. Maintenance vehicle 320 can travel along first and second tracks 601', 602', or can be moved by optional platform 605' along first and second tracks 601', 602', towards and into alignment with the end of second elongated rail 310' including third support surface 313' and fourth support surface 314'. Maintenance vehicle 320 can travel off of first and second tracks 601', 602' or off of optional platform 605' onto the third support surface 313' and fourth support surface 314' of second elongated rail 310' so as to maintain photovoltaic modules 330 of second elongated rail 310'. In the embodiment illustrated in FIG. 6B, first track 601' can be considered to couple first support surface 313 to fourth support surface 314', and second track 602' can be considered to couple second support surface 314 to third support surface 313'. Other configurations are possible.

For example, FIG. 6C is a simplified diagram showing a perspective view of yet another exemplary rail-to-rail mechanism for moving a maintenance vehicle from a first rail based array of photovoltaic modules to a second rail based array of photovoltaic modules, according to certain embodiments, e.g., row-to-row track for moving the maintenance vehicle from on row to the next row of solar panels. This diagram is merely an example, which should not unduly limit the scope of the claims. One of ordinary skill in the art would recognize many variations, alternatives, and modifications. Rail-to-rail mechanism 600" illustrated in FIG. 6C includes first track 601", second track 602", third track 603", fourth track 604", and optional platform (not specifically illustrated). Upon reaching the end of first elongated rail 310 including first support surface 313 and second support surface 314 to which maintenance vehicle 320 is movably coupled, the maintenance vehicle can move off of the end of first elongated rail 310 and either directly onto first and second tracks 601", 602" or onto the optional platform that can be supported by first and second tracks 601", 602". Maintenance vehicle 320 can travel along first and second tracks 601", 602", or can be moved by the optional platform along first and second tracks 601", 602" towards an intermediate position at which maintenance vehicle 320 then can travel along third and fourth tracks 603", 604" or can be moved by the optional platform along third and fourth tracks 603", 604" towards and into alignment with the end of second elongated rail 310' including third support surface 313' and fourth support surface 314'. Maintenance vehicle 320 can travel off of third and fourth tracks 603", 604" or off of the optional platform onto the third support surface 313' and fourth support surface 314' of second elongated rail 310' so as to maintain photovoltaic modules 330 of second elongated rail 310'. In the embodiment illustrated in FIG. 6C, first and second tracks 601", 602" can be considered to couple first support surface 313 to third support surface 313', and third and fourth tracks 603", 604" can be considered to couple second support surface 314 to fourth support surface 314'. Other configurations are possible.

Note that in embodiments in which the row-to-row mechanism includes a platform coupled to the at least one track and configured to carry the maintenance vehicle from the first elongated rail 310 to the second elongated rail 310', e.g., platform 605 coupled to tracks 601 and 602, or platform 605' coupled to tracks 601' and 602', or platform coupled to tracks 601", 602", 603", and 604", the row-to-row mechanism optionally can include a power source and a motor coupled to the platform and configured to move the platform based on power from the power source. Exemplary power sources include DC electrical power such as from a photovoltaic module or solar panel, or batter, and AC electrical power, such as from an electrical grid.

Figure 7:
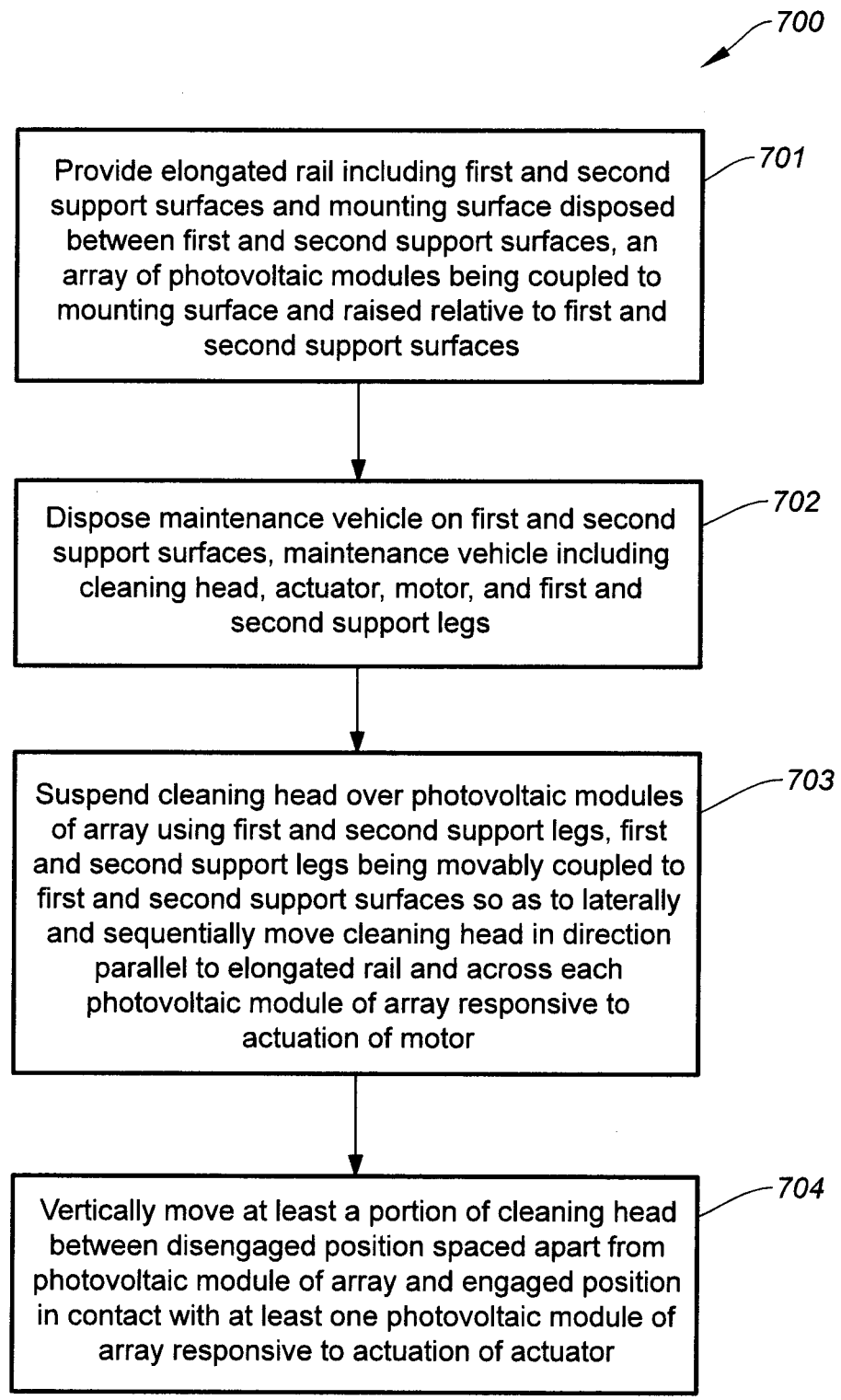
FIG. 7 illustrates steps in an exemplary method for maintaining at least one rail based array of photovoltaic modules, according to certain embodiments.

FIG. 7 illustrates steps in an exemplary method for maintaining at least one rail based array of photovoltaic modules, according to certain embodiments. This diagram is merely an example, which should not unduly limit the scope of the claims. One of ordinary skill in the art would recognize many variations, alternatives, and modifications. Method 700 illustrated in FIG. 7 includes providing an elongated rail including first and second support surfaces and a mounting surface disposed between the first and second support surfaces, an array of photovoltaic modules being coupled to the mounting surface and raised relative to the first and second support surfaces (701). In one illustrative, nonlimiting example, elongated rail 310 described above with reference to FIGS. 3A-3B can be provided including first and second support surfaces 313, 314 and first and second mounting surfaces 311, 312 disposed therebetween. A plurality of photovoltaic modules 330 can be coupled to first and second mounting surfaces, e.g., via legs 331, 332, that can raise photovoltaic modules 330 above first and second support surfaces 313, 314.

Referring again to FIG. 7, method 700 further can include disposing a maintenance vehicle on the first and second support surfaces, the maintenance vehicle including a cleaning head, actuator, motor, and first and second support legs (702). In one illustrative, nonlimiting example, maintenance vehicle 320 described above with reference to FIGS. 3A-5C can be disposed on first and second support surfaces 313, 314 of elongated rail 310, e.g., via wheels or caterpillar treads coupled to first and second support legs 322, 323, and any other (optional) legs that vehicle 320 can include. In this example, maintenance vehicle 320 also includes cleaning head 340 including actuator 343 and motor 327.

As illustrated in FIG. 7, method 700 also can include suspending the cleaning head over the photovoltaic modules of the array using the first and second support legs, the first and second support legs being movably coupled to the first and second support surfaces so as to laterally and sequentially move the cleaning head in a direction parallel to the elongated rail and across each photovoltaic module of the array responsive to actuation of the motor (703). In one illustrative, nonlimiting example, maintenance vehicle 320 illustrated in FIGS. 3A-3B can suspend cleaning head 340 over photovoltaic modules 330 of the array using first and second support legs 321, 322 and any other (optional) legs that vehicle 320 can include. The first and second support legs 321, 322 can be movably coupled, e.g., via wheels or caterpillar treads, to first and second support surfaces 313, 314. Actuation of motor 327 can cause maintenance vehicle 320 to laterally move along elongated rail 310 in a direction parallel to elongated rail 310, so as to laterally and sequentially move cleaning head 340 in a direction parallel to elongated rail 310 and across photovoltaic modules 330 of the array.

Referring again to FIG. 7, method 700 also can include vertically moving at least a portion of the cleaning head between a disengaged position spaced apart from the photovoltaic module of the array and an engaged position in contact with at least one photovoltaic module of the array responsive to actuation of the actuator (704). In one nonlimiting, illustrative example, as discussed above with reference to FIGS. 4A-5C, actuator 343 can cause brush 344 and wiper or squeegee 347 to be raised or lowered relative to photovoltaic module 330, e.g., such that brush 344 or both brush 344 and wiper or squeegee 347 can contact photovoltaic module 330. In an alternative embodiment, an actuator can cause additional portions, or even the entirety, of cleaning head 340 to be raised or lowered so as to contact photovoltaic module 330. As discussed with reference to FIGS. 4A-5C, additional motors or actuators can cause additional actions that can facilitate cleaning photovoltaic module 330. For example, actuation of a second motor 342 can cause rotation of brush 344 about an axis parallel to photovoltaic module 330, or actuation of a second actuator (not illustrated) can cause fluid to be dispensed from fluid reservoir 341 onto brush 344 or onto photovoltaic module 330.

Note that the steps of method 700 can be performed in any suitable order. For example, disposing the maintenance vehicle on the first and second support surfaces (702) can occur concurrently with suspending the cleaning head over the photovoltaic modules of the array using the first and second support legs (703). That is, performing the disposing also may perform the suspending. Additionally, laterally and sequentially moving the cleaning head in a direction parallel to the elongated rail (703) can be performed before, during, or after vertically moving at least a portion of the cleaning head between the disengaged and engaged positions (704). In one illustrative, nonlimiting example, as mentioned above with reference to FIGS. 4A-5C, a controller of maintenance vehicle 320 suitably can be programmed to actuate actuator 343 so as to lower at least a portion of cleaning head 340 into contact with photovoltaic module before actuating motor 327 so as to cause lateral movement of cleaning head 340.

According to yet another embodiment, a system for maintaining photovoltaic modules is provided. The system can include a first elongated rail including first and second support surfaces and a first mounting surface disposed between the first and second support surfaces, a first array of the photovoltaic modules being coupled to the first mounting surface and raised relative to the first and second support surfaces; and a first maintenance vehicle disposed on the first and second support surfaces, the first maintenance vehicle including a first cleaning head, a first actuator, a first motor, and first and second support legs. The first and second support legs can suspend the first cleaning head over the photovoltaic modules of the first array and can be movably coupled to the first and second support surfaces so as to laterally and sequentially move the first cleaning head in a direction parallel to the first elongated rail and across each of the photovoltaic modules of the first array responsive to actuation of the first motor. At least a portion of the first cleaning head can be vertically movable between a disengaged position spaced apart from the photovoltaic modules of the first array and a first engaged position in contact with at least one of the photovoltaic modules of the first array responsive to actuation of the first actuator. For example, the system is implemented according to at least FIGS. 3A-3B, 4A-4B, 5A-5C, and 6A-6C.

In another example, the first cleaning head includes a second motor, the at least a portion of the first cleaning head including a brush movable to contact at least one of the photovoltaic modules of the first array in the first engaged position responsive to actuation of the first actuator, the brush further being rotatable along an axis parallel to the photovoltaic modules of the first array responsive to actuation of the second motor. In another example, the first cleaning head further includes a fluid reservoir; and a second actuator, the first cleaning head being operable to dispense fluid from the fluid reservoir onto at least one of the photovoltaic modules of the first array responsive to actuation of the second actuator. In another example, the first cleaning head further includes a wiper, the wiper being in contact with at least one photovoltaic module of the first array when the at least a portion of the first cleaning head is in the first engaged position and operable to at least partially dry the at least one photovoltaic module of the first array. In another example, the at least a portion of the first cleaning head further is vertically movable, responsive to actuation of the first actuator, to a second engaged position in which the brush contacts at least one photovoltaic module of the array and the wiper does not contact the array.

In another example, the first and second support legs respectively are movably coupled to the first and second support surfaces by first and second wheels that respectively contact and rotate along the first and second support surfaces. In another example, the first maintenance vehicle further includes a third support leg movably coupled to one of the first and second support surfaces by a third wheel that respectively contacts and rotates along the one of the first and second support surfaces. In another example, the first maintenance vehicle further includes a limit switch configured to detect an end of the first elongated rail.

In another example, the system further includes a second elongated rail including third and fourth support surfaces and a second mounting surface, a second array of the photovoltaic modules being coupled to the second mounting surface and raised relative to the third and fourth support surfaces. In another example, the system further includes a second maintenance vehicle disposed on the third and fourth support surfaces, the second maintenance vehicle including a second cleaning head, a second actuator, a second motor, and third and fourth support legs, the third and fourth support legs suspending the second cleaning head over the photovoltaic modules of the second array and being movably coupled to the third and fourth support surfaces so as to laterally and sequentially move the second cleaning head in a direction parallel to the second elongated rail and across each of the photovoltaic modules of the second array responsive to actuation of the second motor, at least a portion of the second cleaning head being vertically movable between a disengaged position spaced apart from the photovoltaic modules of the second array and a second engaged position in contact with at least one of the photovoltaic modules of the second array responsive to actuation of the second actuator.

In another example, the system further includes a row-to-row mechanism configured to move the first maintenance vehicle from the first elongated rail to the second elongated rail. In another example, the row-to-row mechanism includes at least one track, the at least one track coupling the first support surface to one of the third and fourth support surfaces and coupling the second support surface to the other of the third and fourth support surfaces. In another example, the at least one track includes a first track coupling the first support surface to the third support surface, and a second track coupling the second support surface to the fourth support surface. In another example, the at least one track includes first and second tracks coupling the first support surface to the third support surface, and third and fourth tracks coupling the second support surface to the fourth support surface. In another example, the row-to-row mechanism further includes a platform coupled to the at least one track and configured to carry the first maintenance vehicle from the first elongated rail to the second elongated rail. In another example, the row-to-row mechanism includes a power source and a motor coupled to the platform and configured to move the platform based on power from the power source.

In another example, at least one of the first and second support legs is adjustable so as to accommodate photovoltaic modules at different angles than one another. In another example, the first maintenance vehicle further includes a solar panel configured to provide power for actuating the first actuator and the first motor. In another example, the first maintenance vehicle further includes a trimmer mechanism to remove vegetation. In another example, the first maintenance vehicle is wirelessly controllable. In another example, the wireless control is manageable via a web interface. In another example, the first and second vehicle support surfaces and the at least one mounting surface are integrally formed with one another. In another example, the first and second vehicle support surfaces and the at least one mounting surface are integrally formed of extruded concrete disposed on the ground.

According to another embodiment, a method for maintaining photovoltaic modules is provided. The method can include providing a first elongated rail including first and second support surfaces and a first mounting surface disposed between the first and second support surfaces, a first array of the photovoltaic modules being coupled to the first mounting surface and raised relative to the first and second support surfaces; disposing a first maintenance vehicle on the first and second support surfaces, the first maintenance vehicle including a first cleaning head, a first actuator, a first motor, and first and second support legs; suspending the first cleaning head over the photovoltaic modules of the first array using the first and second support legs, the first and second support legs being movably coupled to the first and second support surfaces so as to laterally and sequentially move the first cleaning head in a direction parallel to the first elongated rail and across each of the photovoltaic modules of the first array responsive to actuation of the first motor; and vertically moving at least a portion of the first cleaning head between a disengaged position spaced apart from the photovoltaic modules of the first array and a first engaged position in contact with at least one of the photovoltaic modules of the first array responsive to actuation of the first actuator. For example, the method is implemented at least according to FIG. 7.

In another example, the first cleaning head includes a second motor, the at least a portion of the first cleaning head including a brush contacting at least one of the photovoltaic modules of the first array when the first cleaning head is in the first engaged position responsive to actuation of the first actuator, the method further including rotating the brush along an axis parallel to the photovoltaic modules of the first array responsive to actuation of the second motor. In another example, the first cleaning head further includes a fluid reservoir and a second actuator, the method further including dispensing fluid from the fluid reservoir onto at least one of the photovoltaic modules of the first array responsive to actuation of the second actuator. In another example, the first cleaning head further includes a wiper, the wiper contacting at least one photovoltaic module of the first array when the at least a portion of the first cleaning head is in the first engaged position, the method further including at least partially dry the at least one photovoltaic module of the first array via the contact with the wiper. In another example, the method includes vertically moving the at least a portion of the first cleaning head, responsive to actuation of the first actuator, to a second engaged position in which the brush contacts at least one photovoltaic module of the array and the wiper does not contact the array.

In another example, the first and second support legs respectively are movably coupled to the first and second support surfaces by first and second wheels that respectively contact and rotate along the first and second support surfaces. In another example, the first maintenance vehicle further includes a third support leg movably coupled to one of the first and second support surfaces by a third wheel that respectively contacts and rotates along the one of the first and second support surfaces. In another example, the first maintenance vehicle further detects an end of the first elongated rail using a limit switch.

In another example, the method further includes providing a second elongated rail including third and fourth support surfaces and a second mounting surface, a second array of the photovoltaic modules being coupled to the second mounting surface and raised relative to the third and fourth support surfaces. In another example, the method further includes disposing a second maintenance vehicle on the third and fourth support surfaces, the second maintenance vehicle including a second cleaning head, a second actuator, a second motor, and third and fourth support legs; suspending the second cleaning head over the photovoltaic modules of the second array using the third and fourth support legs, the third and fourth support legs being movably coupled to the third and fourth support surfaces so as to laterally and sequentially move the second cleaning head in a direction parallel to the second elongated rail and across each of the photovoltaic modules of the second array responsive to actuation of the second motor; and vertically moving at least a portion of the second cleaning head between a disengaged position spaced apart from the photovoltaic modules of the second array and a second engaged position in contact with at least one of the photovoltaic modules of the second array responsive to actuation of the second actuator.

In another example, the method further includes moving the first maintenance vehicle from the first elongated rail to the second elongated rail using a row-to-row mechanism. In another example, the row-to-row mechanism includes at least one track, the at least one track coupling the first support surface to one of the third and fourth support surfaces and coupling the second support surface to the other of the third and fourth support surfaces. In another example, the at least one track includes a first track coupling the first support surface to the third support surface, and a second track coupling the second support surface to the fourth support surface. In another example, the at least one track includes first and second tracks coupling the first support surface to the third support surface, and third and fourth tracks coupling the second support surface to the fourth support surface. In another example, the row-to-row mechanism further includes a platform coupled to the at least one track, the method further including carrying the first maintenance vehicle from the first elongated rail to the second elongated rail using the platform. In another example, the row-to-row mechanism includes a power source and a motor coupled to the platform and moving the platform based on power from the power source.

In another example, the method further includes adjusting at least one of the first and second support legs so as to accommodate photovoltaic modules at different angles than one another. In another example, the first maintenance vehicle further includes a solar panel providing power for actuating the first actuator and the first motor. In another example, the first maintenance vehicle further includes a trimmer mechanism, the method further including removing the vegetation with the trimmer. In another example, the method further includes wirelessly controlling the first maintenance vehicle. In another example, the wireless control is via a web interface. In another example, the method includes forming the first and second vehicle support surfaces and the at least one mounting surface integrally with one another. In another example, integrally forming the first and second vehicle support surfaces and the at least one mounting surface includes extruding concrete onto the ground.

Although specific embodiments of the present invention have been described, it will be understood by those of skill in the art that there are other embodiments that are equivalent to the described embodiments. For example, various embodiments and/or examples of the present invention can be combined. Accordingly, it is to be understood that the invention is not to be limited by the specific illustrated embodiments, but only by the scope of the appended claims.

What is claimed:
1. A system for maintaining photovoltaic modules, the system including:
　　a first elongated rail including first and second support surfaces and a first mounting surface disposed between the first and second support surfaces, a first array of the photovoltaic modules being coupled to the first mounting surface and raised relative to the first and second support surfaces; and
　　a first maintenance vehicle disposed on the first and second support surfaces, the first maintenance vehicle including a first cleaning head, a first actuator, a first motor, and first and second support legs,
　　the first and second support legs suspending the first cleaning head over the photovoltaic modules of the first array and being movably coupled to the first and second support surfaces so as to laterally and sequentially move the first cleaning head in a direction parallel to the first elongated rail and across each of the photovoltaic modules of the first array responsive to actuation of the first motor,
　　at least a portion of the first cleaning head being vertically movable between a disengaged position spaced apart from the photovoltaic modules of the first array and a first engaged position in contact with at least one of the photovoltaic modules of the first array responsive to actuation of the first actuator,
　　the first cleaning head including:
　　　　a second motor;
　　　　a brush;
　　　　a fluid reservoir;
　　　　a wiper; and
　　　　a second actuator,
　　　　the at least a portion of the first cleaning head including the brush movable to contact at least one of the photovoltaic modules of the first array in the first engaged position responsive to actuation of the first actuator,
　　　　the brush further being rotatable along an axis parallel to the photovoltaic modules of the first array responsive to actuation of the second motor,
　　　　the first cleaning head being operable to dispense fluid from the fluid reservoir onto at least one of the photovoltaic modules of the first array responsive to actuation of the second actuator,
　　　　the wiper being in contact with at least one photovoltaic module of the first array when the at least a portion of the first cleaning head is in the first engaged position and operable to at least partially dry the at least one photovoltaic module of the first array, and the at least a portion of the first cleaning head further being vertically movable, responsive to actuation of the first actuator, to a second engaged position in which the brush contacts at least one photovoltaic module of the array and the wiper does not contact the array.

2. The system of claim 1, wherein the first and second support surfaces and the first mounting surface each comprises concrete disposed on the ground, wherein the first and second support legs respectively are movably coupled to the concrete of the first and second support surfaces by first and second wheels that respectively contact and rotate along the concrete of the first and second support surfaces.

3. The system of claim 2, the first maintenance vehicle further including a third support leg movably coupled to the concrete of one of the first and second support surfaces by a third wheel that respectively contacts and rotates along the concrete of the one of the first and second support surfaces.

4. The system of claim 2, wherein the concrete of the first and second support surfaces and the concrete of the first mounting surface are integrally formed with one another.

5. The system of claim 2, wherein the concrete of the first support surface is separate from and spaced apart from the concrete of the second support surface.

6. The system of claim 1, the first maintenance vehicle further including a limit switch configured to detect an end of the first elongated rail.

7. The system of claim 1, further including a second elongated rail including third and fourth support surfaces and a second mounting surface, a second array of the photovoltaic modules being coupled to the second mounting surface and raised relative to the third and fourth support surfaces, wherein the third and fourth support surfaces and the second mounting surface each comprises concrete disposed on the ground.

8. The system of claim 7, further including:

a second maintenance vehicle disposed on the concrete of the third and fourth support surfaces, the second maintenance vehicle including a second cleaning head, a second actuator, a second motor, and third and fourth support legs, the third and fourth support legs suspending the second cleaning head over the photovoltaic modules of the second array and being movably coupled to the concrete of the third and fourth support surfaces so as to laterally and sequentially move the second cleaning head in a direction parallel to the second elongated rail and across each of the photovoltaic modules of the second array responsive to actuation of the second motor, at least a portion of the second cleaning head being vertically movable between a disengaged position spaced apart from the photovoltaic modules of the second array and a second engaged position in contact with at least one of the photovoltaic modules of the second array responsive to actuation of the second actuator.

9. The system of claim 7, further including a row-to-row mechanism configured to move the first maintenance vehicle from the first elongated rail to the second elongated rail.

10. The system of claim 9, wherein the row-to-row mechanism includes at least one track, the at least one track coupling the first support surface to one of the third and fourth support surfaces and coupling the second support surface to the other of the third and fourth support surfaces.

11. The system of claim 10, wherein the at least one track includes a first track coupling the first support surface to the third support surface, and a second track coupling the second support surface to the fourth support surface.

12. The system of claim 10, wherein the at least one track includes first and second tracks coupling the first support surface to the third support surface, and third and fourth tracks coupling the second support surface to the fourth support surface.

13. The system of claim 10, the row-to-row mechanism further including a platform coupled to the at least one track and configured to carry the first maintenance vehicle from the first elongated rail to the second elongated rail.

14. The system of claim 13, the row-to-row mechanism including a power source and a motor coupled to the platform and configured to move the platform based on power from the power source.

15. The system of claim 1, wherein at least one of the first and second support legs is adjustable so as to accommodate photovoltaic modules at different angles than one another.

16. The system of claim 1, the first maintenance vehicle further including a solar panel configured to provide power for actuating the first actuator and the first motor.

17. The system of claim 1, the first maintenance vehicle further including a trimmer mechanism to remove vegetation.

18. The system of claim 1, the first maintenance vehicle being wirelessly controllable.

19. The system of claim 18, wherein the wireless control is manageable via a web interface.

20. A method for maintaining photovoltaic modules, the method including:

providing a first elongated rail including first and second support surfaces and a first mounting surface disposed between the first and second support surfaces, a first array of the photovoltaic modules being coupled to the first mounting surface and raised relative to the first and second support surfaces;

disposing a first maintenance vehicle on the first and second support surfaces, the first maintenance vehicle including a first cleaning head, a first actuator, a first motor, and first and second support legs;

suspending the first cleaning head over the photovoltaic modules of the first array using the first and second support legs, the first and second support legs being movably coupled to the first and second support surfaces so as to laterally and sequentially move the first cleaning head in a direction parallel to the first elongated rail and across each of the photovoltaic modules of the first array responsive to actuation of the first motor; and vertically moving at least a portion of the first cleaning head between a disengaged position spaced apart from the photovoltaic modules of the first array and a first engaged position in contact with at least one of the photovoltaic modules of the first array responsive to actuation of the first actuator, the first cleaning head further including:
  a second motor;
  a brush;
  a fluid reservoir;
  a wiper; and
  a second actuator,
  the at least a portion of the first cleaning head including the brush contacting at least one of the photovoltaic modules of the first array when the first cleaning head is in the first engaged position responsive to actuation of the first actuator, the method further including rotating the brush along an axis parallel to the photovoltaic modules of the first array responsive to actuation of the second motor, the method further including dispensing fluid from the fluid reservoir onto at least one of the photovoltaic modules of the first array responsive to actuation of the second actuator, the wiper contacting at least one photovoltaic module of the first array when the at least a portion of the first cleaning head is in the first engaged position, the method further including at least partially drying the at least one photovoltaic module of the first array via the contact with the wiper, the method further including vertically moving the at least a portion of the first cleaning head, responsive to actuation of the first actuator, to a second engaged position in which the brush contacts at least one photovoltaic module of the array and the wiper does not contact the array.

21. The method of claim 20, wherein the first and second support surfaces and the first mounting surface each comprises concrete disposed on the ground, wherein the first and second support legs respectively are movably coupled to the concrete first and second support surfaces by first and second wheels that respectively contact and rotate along the concrete of the first and second support surfaces.

22. The method of claim 21, the first maintenance vehicle further including a third support leg movably coupled to the concrete of one of the first and second support surfaces by a third wheel that respectively contacts and rotates along the concrete of the one of the first and second support surfaces.

23. The method of claim 21, including forming the concrete of the first and second support surfaces and the concrete of the first mounting surface integrally with one another.

24. The method of claim 21, wherein the concrete of the first support surface is separate from and spaced apart from the concrete of the second support surface.

25. The method of claim 20, the first maintenance vehicle further detecting an end of the first elongated rail using a limit switch.

26. The method of claim 20, further including providing a second elongated rail including third and fourth support surfaces and a second mounting surface, a second array of the photovoltaic modules being coupled to the second mounting surface and raised relative to the third and fourth support surfaces,
wherein the third and fourth support surfaces and the second mounting surface each comprises concrete disposed on the ground.

27. The method of claim 26, further including:
disposing a second maintenance vehicle on the concrete of the third and fourth support surfaces, the second maintenance vehicle including a second cleaning head, a second actuator, a second motor, and third and fourth support legs;

suspending the second cleaning head over the photovoltaic modules of the second array using the third and fourth support legs, the third and fourth support legs being movably coupled to the concrete of the third and fourth support surfaces so as to laterally and sequentially move the second cleaning head in a direction parallel to the second elongated rail and across each of the photovoltaic modules of the second array responsive to actuation of the second motor; and vertically moving at least a portion of the second cleaning head between a disengaged position spaced apart from the photovoltaic modules of the second array and a second engaged position in contact with at least one of the photovoltaic modules of the second array responsive to actuation of the second actuator.

28. The method of claim 26, further including moving the first maintenance vehicle from the first elongated rail to the second elongated rail using a row-to-row mechanism.

29. The method of claim 28, wherein the row-to-row mechanism includes at least one track, the at least one track coupling the first support surface to one of the third and fourth support surfaces and coupling the second support surface to the other of the third and fourth support surfaces.

30. The method of claim 29, wherein the at least one track includes a first track coupling the first support surface to the third support surface, and a second track coupling the second support surface to the fourth support surface.

31. The method of claim 29, wherein the at least one track includes first and second tracks coupling the first support surface to the third support surface, and third and fourth tracks coupling the second support surface to the fourth support surface.

32. The method of claim 29, the row-to-row mechanism further including a platform coupled to the at least one track, the method further including carrying the first maintenance vehicle from the first elongated rail to the second elongated rail using the platform.

33. The method of claim 32, the row-to-row mechanism including a power source and a motor coupled to the platform and moving the platform based on power from the power source.

34. The method of claim 20, further including adjusting at least one of the first and second support legs so as to accommodate photovoltaic modules at different angles than one another.

35. The method of claim 20, the first maintenance vehicle further including a solar panel providing power for actuating the first actuator and the first motor.

36. The method of claim 20, the first maintenance vehicle further including a trimmer mechanism, the method further including removing the vegetation with the trimmer.

37. The method of claim 20, further including wirelessly controlling the first maintenance vehicle.

38. The method of claim 37, wherein the wireless control is via a web interface.

* * * * *